US007507155B2

(12) United States Patent
Mead et al.

(10) Patent No.: US 7,507,155 B2
(45) **Date of Patent: *Mar. 24, 2009**

(54) GAMING DEVICE HAVING A SELECTION GAME WITH BUILDING AWARDS

(75) Inventors: Randall D. Mead, Carson City, NV (US); Amy J. Hale, Carson City, NV (US); Eric S. Nelson, Sparks, NV (US)

(73) Assignee: IGT, Reno, NV (US)

( * ) Notice: Subject to any disclaimer, the term of this patent is extended or adjusted under 35 U.S.C. 154(b) by 583 days.

This patent is subject to a terminal disclaimer.

(21) Appl. No.: 11/219,994

(22) Filed: Sep. 6, 2005

(65) Prior Publication Data

US 2006/0030401 A1 Feb. 9, 2006

Related U.S. Application Data

(63) Continuation-in-part of application No. 10/649,092, filed on Aug. 27, 2003, now Pat. No. 7,040,984.

(51) Int. Cl.
*G06F 17/00* (2006.01)
*G06F 19/00* (2006.01)

(52) U.S. Cl. ............................ 463/16; 463/17; 463/18; 463/19; 463/20; 463/21; 463/22; 463/25; 463/31; 273/138.1; 273/139

(58) Field of Classification Search ............. 463/16–22, 463/25, 31; 273/138, 138.1, 139
See application file for complete search history.

(56) References Cited

U.S. PATENT DOCUMENTS 4,448,419 A 5/1984 Telnaes (Continued)

FOREIGN PATENT DOCUMENTS

EP 0874337 A1 10/1998

(Continued)

OTHER PUBLICATIONS

Addams Family Article written by Strictly Slots, published in 2000.

(Continued)

*Primary Examiner*—John M Hotaling, II
*Assistant Examiner*—Milap Shah
(74) *Attorney, Agent, or Firm*—Bell Boyd & Lloyd LLP

(57) ABSTRACT

A gaming device that enables a player to pick at least one of a plurality of selections, wherein at least one of the selections is associated with a terminator. The gaming device determines if the picked selection is associated with a terminator. If the picked selection is not associated with a terminator, the gaming device places the picked selection to occupy a position of a selection group. The gaming device enables the player to pick another one of the selections and again determines if the picked selection is associated with a terminator. If the picked selection is associated with a terminator, the gaming device modifies the position of at least one of the picked selections. After modifying the positions of one or more of the picked selections, the gaming device determines the modified award based on the awards or values associated with the modified positions of the picked selections. The gaming device provides the determined modified award to the player and ends the game.

18 Claims, 19 Drawing Sheets

U.S. PATENT DOCUMENTS 4,582,324 A 4/1986 Koza et al.
4,624,459 A 11/1986 Kaufman
4,695,053 A 9/1987 Vazquez, Jr. et al.
4,991,848 A 2/1991 Greenwood et al.
5,178,390 A 1/1993 Okada
5,205,555 A 4/1993 Hamano
5,342,047 A 8/1994 Heidel et al.
5,382,023 A 1/1995 Roberts et al.
5,456,465 A 10/1995 Durham
5,524,888 A 6/1996 Heidel
5,536,016 A 7/1996 Thompson
5,542,669 A 8/1996 Charron et al.
5,560,603 A 10/1996 Seelig et al.
5,584,763 A 12/1996 Kelly et al.
5,611,535 A 3/1997 Tiberio
5,647,798 A 7/1997 Falciglia
5,711,525 A 1/1998 Breeding
5,769,716 A 6/1998 Saffari et al.
5,772,509 A 6/1998 Weiss
5,775,692 A 7/1998 Watts et al.
5,788,573 A 8/1998 Baerlocher et al.
5,823,874 A 10/1998 Adams
5,833,538 A 11/1998 Weiss
5,848,932 A 12/1998 Adams
5,851,148 A 12/1998 Brune et al.
5,855,514 A 1/1999 Kamille
5,873,781 A 2/1999 Keane
5,882,261 A 3/1999 Adams
5,902,184 A 5/1999 Bennett et al.
5,911,418 A 6/1999 Adams
5,947,820 A 9/1999 Morro et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,997,400 A 12/1999 Seelig et al.
5,997,401 A 12/1999 Crawford
6,004,207 A 12/1999 Wilson, Jr. et al.
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mangano et al.
6,062,980 A 5/2000 Luciano
6,068,552 A 5/2000 Walker et al.
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,120,031 A 9/2000 Adams
6,126,541 A 10/2000 Fuchs
6,126,542 A 10/2000 Fier
6,142,873 A 11/2000 Weiss et al.
6,142,874 A 11/2000 Kodachi et al.
6,142,875 A 11/2000 Kodachi et al.
6,146,270 A 11/2000 Huard et al.
6,146,273 A 11/2000 Olsen
6,149,156 A 11/2000 Feola
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,189,886 B1 2/2001 Moran
6,190,254 B1 2/2001 Bennett
6,190,255 B1 2/2001 Thomas et al.
6,203,429 B1 3/2001 Demar et al.
6,210,279 B1 4/2001 Dickinson
6,213,876 B1 4/2001 Moore, Jr.
6,224,483 B1 5/2001 Mayeroff
6,231,442 B1 5/2001 Mayeroff
6,231,445 B1 5/2001 Acres
6,261,177 B1 7/2001 Bennett
6,302,790 B1 10/2001 Brossard
6,305,686 B1 10/2001 Perrie et al.
6,309,300 B1 10/2001 Glavich
6,312,334 B1 11/2001 Yoseloff
6,328,649 B1 12/2001 Randall et al.
6,375,187 B1 4/2002 Baerlocher
6,398,218 B1 6/2002 Vancura
6,413,160 B1 7/2002 Vancura
6,413,161 B1 7/2002 Baerlocher et al.
6,435,511 B1 8/2002 Vancura et al.
6,439,995 B1 8/2002 Hughs-Baird et al.
6,461,241 B1 10/2002 Webb et al.
6,464,582 B1 10/2002 Baerlocher et al.
6,494,785 B1 12/2002 Gerrard et al.
6,506,118 B1 1/2003 Baerlocher et al.
6,514,141 B1 2/2003 Kaminkow et al.
6,561,899 B2 5/2003 Vancura
6,569,015 B1 5/2003 Baerlocher et al.
6,575,830 B2 6/2003 Baerlocher et al.
6,585,591 B1 7/2003 Baerlocher et al.
6,595,854 B2 7/2003 Hughs-Baird et al.
6,599,192 B1 7/2003 Baerlocher et al.
6,602,137 B2 8/2003 Kaminkow et al.
6,607,438 B2 8/2003 Baerlocher et al.
6,620,045 B2 9/2003 Berman et al.
6,632,141 B2 10/2003 Webb et al.
6,648,754 B2 11/2003 Baerlocher et al.
6,659,864 B2 12/2003 McGahn et al.
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,733,386 B2 5/2004 Cuddy et al.
6,758,750 B2 7/2004 Baerlocher et al.
6,776,711 B1 8/2004 Baerlocher et al.
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,852,030 B2 2/2005 Baerlocher et al.
7,037,191 B2 * 5/2006 Rodgers et al. ............... 463/16
7,351,141 B2 * 4/2008 Rodgers et al. ............... 463/16
2002/0045475 A1 4/2002 Glavich et al.
2002/0072402 A1 6/2002 Baerlocher
2002/0142822 A1 10/2002 Baerlocher et al.
2002/0151350 A1 10/2002 Baerlocher et al.
2002/0155883 A1 10/2002 Baerlocher
2002/0187827 A1 12/2002 Blankstein
2003/0013514 A1 1/2003 Cregan et al.
2003/0040355 A1 2/2003 Baerlocher
2003/0040360 A1 2/2003 Kaminkow
2003/0045344 A1 3/2003 Webb et al.
2003/0045348 A1 3/2003 Palmer et al.
2003/0045350 A1 3/2003 Baerlocher et al.
2003/0060260 A1 3/2003 Gerrard et al.
2003/0064795 A1 4/2003 Baerlocher et al.
2003/0087693 A1 5/2003 Baerlocher et al.
2003/0157982 A1 8/2003 Gerrard et al.
2003/0211880 A1 11/2003 Locke
2004/0009805 A1 1/2004 Baerlocher et al.
2004/0106444 A1 6/2004 Cuddy et al.

2005/0197182 A1 9/2005 Duhamel

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 3/2000 |
| WO | WO 9732285 | | 9/1997 |
| WO | WO 00/12186 | | 3/2000 |

OTHER PUBLICATIONS

American Bandstand Article, written by Strictly Slots, published in 2002.
By George Advertisement, written by IGT, published in 2002.
Cash for Life—Offer Bonus Advertisement/Lotsa Loot Advertisement/Take It or Leave It Advertisement, written by Bally Gaming, published in 2002.
Deep Pockets Advertisement, written by IGT, published in 2002.
Deep Pockets Article, written by Strictly Slots, published in 2002.
Double Top Dollar Advertisement, written by IGT, published in 2003.
Fire and Fortune Article, written by Strictly Slots, published in 2001.
Hollywood Advertisement, written by Shuffle Master Gaming, published in 2001.
King Cash Slots Advertisement, written by IGT, published in 2003.
Let's Make A Deal Advertisements written by Bally Gaming/Shuffle Master Gaming, published in 2001.
Press Your Luck Article, written by Strictly Slots, published in 2000.
Price is Right—Cliff Hangers Description, printed from www.geocities.com (web site), on Mar. 21, 2001.
Price is Right—Showcases Description, printed from schuminweb.com (web site) on Mar. 16, 2001.
Psycho Cash Beast Advertisement, written by IGT, published in 1999.
Take Your Pick Advertisement, written by IGT/Anchor Gaming, published in 1999.
Take Your Pick Article, written by Strictly Slots, published in 2001.
Top Dollar Game Advertisement, written by IGT, published in 1998.

* cited by examiner

GAMING DEVICE HAVING A SELECTION GAME WITH BUILDING AWARDS

PRIORITY CLAIM

This application is a continuation-in-part of and claims the benefit of U.S. patent application Ser. No. 10/649,092, filed Aug. 27, 2003, now U.S. Pat. No. 7,040,984, the entire contents of which are incorporated herein.

CROSS-REFERENCE TO RELATED APPLICATIONS

This application is related to the following commonly-owned co-pending patent applications: "GAMING DEVICE HAVING AN IMPROVED OFFER/ACCEPTANCE BONUS SCHEME," Ser. No. 09/966,884, "GAMING DEVICE HAVING OFFER AND ACCEPTANCE GAME WITH HIDDEN OFFER," Ser. No. 10/160,688, "GAMING DEVICE HAVING OFFER/ACCEPTANCE ADVANCE THRESHOLD AND LIMIT BONUS SCHEME," Ser. No. 09/838,014, "GAMING DEVICE HAVING IMPROVED OFFER AND ACCEPTANCE GAME WITH MASKED OFFERS," Ser. No. 10/086,014, "GAMING DEVICE HAVING AN OFFER AND ACCEPTANCE GAME WITH A PLAYER SELECTION FEATURE," Ser. No. 10/086,078, "GAMING DEVICE HAVING OFFER AND ACCEPTANCE GAME WITH A PLURALITY OF AWARD POOLS, A REVEAL FEATURE, AND A MODIFY FEATURE," Ser. No. 10/255,862, "GAMING DEVICE HAVING IMPROVED OFFER AND ACCEPTANCE BONUS SCHEME," Ser. No. 10/074,273, "GAMING DEVICE HAVING AN OFFER/ACCEPTANCE GAME WITH MULTI-OFFER SYMBOL," Ser. No. 10/245,387, "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134, "GAMING DEVICE HAVING AN OFFER AND ACCEPTANCE SELECTION BONUS SCHEME WITH A TERMINATOR AND AN ANTI-TERMINATOR," Ser. No. 10/644,447, "GAMING DEVICE HAVING A DESTINATION PURSUIT BONUS SCHEME WITH ADVANCE AND SETBACK CONDITIONS," Ser. No. 10/660,075, "GAMING DEVICE HAVING SEPARATELY CHANGEABLE VALUE AND MODIFIER BONUS SCHEME," Ser. No. 10/767,484, "GAMING DEVICE HAVING AN AWARD OFFER AND TERMINATION BONUS SCHEME," Ser. No. 10/810,146, "GAMING DEVICE HAVING VALUE SELECTION BONUS," Ser. No. 10/803,410, "GAMING DEVICE HAVING A BONUS ROUND WITH MULTIPLE RANDOM AWARD GENERATION AND MULTIPLE RETURN/RISK SCENARIOS," Ser. No. 10/865,713, "GAMING DEVICE HAVING A DESTINATION PURSUIT BONUS SCHEME WITH ADVANCED AND SETBACK CONDITIONS," Ser. No. 10/950,518, "GAMING DEVICE HAVING IMPROVED AWARD OFFER BONUS SCHEME," Ser. No. 10/937,664, "GAMING DEVICE HAVING IMPROVED AWARD OFFER BONUS SCHEME," Ser. No. 10/952,062, "GAMING DEVICE HAVING OFFER ACCEPTANCE GAME WITH TERMINATION LIMIT," Ser. No. 10/971,980, "GAMING DEVICE HAVING AN AWARD EXCHANGE BONUS ROUND AND METHOD FOR REVEALING AWARD EXCHANGE POSSIBILITIES," Ser. No. 10/982,518, and "GAMING DEVICE HAVING RISK EVALUATION BONUS ROUND," Ser. No. 11/041,801.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having bonus games generally employ a triggering event that occurs during the base game. The triggering event temporarily stalls or halts the base game play and enables a player to enter a second, different game, which is the bonus game. The player plays the bonus game, likely receives an award and returns to the base game.

One known bonus game enables players to accept or decline multiple award offers. The TOP DOLLAR® gaming device which is manufactured and distributed by the assignee of this application, provides the player with three offers and a final award. When an offer is given, the player may accept or reject it by pushing an accept button or a reject button, respectively. If the player accepts an offer, the player receives the accepted bonus amount and the bonus round terminates. If the player declines an offer, the game generates another offer for the player. The player is automatically provided with the last selected offer if the player rejects the three previous offers.

In this known offer/acceptance game, when the player rejects an offer, the player risks a current or guaranteed award for a higher value award. The game may instead provide a lower award. The game thus creates a risk for the player. Enabling a player to pick from different risk based alternatives and then enabling the player to accumulate awards or offers from the selected alternatives provides excitement and enjoyment to the player. Therefore a need exists to provide an offer/acceptance game that enables a player to weigh options and explore the consequences of selecting those options where the player may accumulate awards or offers.

SUMMARY

The present invention relates in general to a gaming device, and more particularly to a gaming device having a selection game with building awards. In one embodiment of the present invention, upon the initiation of the selection game, the gaming device provides a plurality of selections and a plurality of selection groups. Each selection is associated with one of the plurality of selection groups. A value or modifier is associated with each selection group. In one embodiment, each selection group includes one or more elements or positions. In one embodiment, each selection group includes the same number of elements or positions as the number of selections associated with that selection group.

Each element or position in each selection group is associated with a ranking. That is, the elements or positions of each selection group are ranked from one to the number of positions or elements in that selection group. A value or modifier is associated with each ranking, wherein in one embodiment, the greater the ranking, the greater the associated value or modifier. Thus, each element or position in each selection group is associated with a value or award (based on the value or modifier associated with the position's selection group and the value or modifier associated with the ranking of the position within the selection group). As described in more detail below, the value or award associated with each position is an offer component that may be combined with other offer components to form an offer. In one embodiment, the selection groups are arranged as rows or columns of a grid configuration. In one embodiment, each column of the grip represents a selection group and each row of the grid represents a different ranking. In this embodiment, the lowest row represents the lowest ranking and the rankings increase sequentially for each higher row. In another embodiment, each row of the grid represents a selection group and each column of the grid represents a different ranking.

In one embodiment of the selection game of the present invention, the gaming device enables the player to pick one or more of the plurality of selections. The selection group associated with each of the picked selections is revealed and the picked selections are moved to, positioned at or displayed to occupy one of the elements or positions of the associated selection group. The value or award associated with the occupied position is revealed to the player. In this embodiment, the picked selection is positioned at the lowest ranking available or unoccupied position in the associated selection group. For example, if the player selects three selections and two of the player picked selections are revealed to be associated with the same first selection group, then the first picked selection is moved to the lowest ranking position of the associated first selection group. The second picked selection is moved to the second lowest ranking position of the associated first selection group. That is, since the first picked selection already occupies the lowest ranking position, the second picked selection is positioned or placed at the second lowest ranking available or unoccupied position of the associated selection group.

In this embodiment, since the value or award associated with each of the rankings is increased as the rankings increase, the value or award associated with the occupied position of the second picked selection will be greater than the value or award associated with the occupied position of the first picked selection. In other words, the more occupied positions the player builds up in a certain selection group with picked selections, the greater the award that will be provided to the player.

In an alternative embodiment, rather than positioning or placing each picked selection at the lowest available ranking of the picked selection's associated selection group, each selection is associated with a position of one of the selection groups. In this embodiment, the picked selection is positioned at the associated position. In another embodiment, the gaming device randomly places each picked selection at one of the positions of one of the selection groups. In this embodiment, each picked selection may or may not be associated with a selection group.

After each of the player picked selections is positioned or placed at one of the positions of the picked selections associated selection group, an offer based on the occupied positions is offered to the player. As each position is associated with an award or value (i.e., the value of the ranking combined with the value associated with the selection group), the offer is based on the award or value associated with each of the positions occupied by picked selections.

The gaming device enables the player to keep the offer or reject the offer. If the player keeps the offer, the offer is provided to the player and the selection game ends. If the player rejects the offer, and the player has at least one remaining offer, then the position of at least one of the picked selections is modified or moved to another position. In one embodiment, the position of a plurality of picked selections are modified or moved to other positions. In another embodiment, the position of each of the picked selections is modified or moved to other positions.

In one embodiment, the position of each picked selection can be modified or moved to another position within the same selection group that the picked selection was initially associated with. In another embodiment, each position is associated with one or more modified positions and the position of the picked selection can be modified or moved to one of the modified positions associated with the currently occupied position. In another embodiment, the position of each picked selection can be modified or moved to any other position in any of the selections groups. It should be appreciated that in the embodiment wherein each picked selection is positioned or placed at the lowest ranking available or unoccupied position, even after the picked selections are modified or moved the lowest ranking available or unoccupied position of each selection group must be occupied before any other position of that selection group may be occupied. For example, if the position of a picked selection is modified or moved to a selection group that has no other occupied positions, then the modified or moved picked selection must be positioned or placed at the lowest ranking available or unoccupied position of the new selection group.

Another offer based on the awards or values associated with the modified positions of the picked selections is offered to the player for acceptance or rejection. If the offer is accepted or the player does not have at least one new offer remaining, the offer is provided to the player and the selection game ends. If the offer is rejected and the player has at least one new offer remaining, then the gaming device again modifies or moves the positions of the picked selections as described above. The selection game then proceeds as described above until the player either accepts an offer or has no new offers remaining.

The present invention provides an offer and acceptance wherein the gaming device enables a player to rearrange or reposition the occupancy of one or more selections of one or more ranked positions wherein each offer offered to the player is based on the currently occupied position of one or more of the selections.

Moreover, the selection game of the present invention provides an offer and acceptance game that enables a player to weigh options and explore the consequences of selecting those options where the player may accumulate awards or offers.

In an alternative embodiment, the selection game of the present invention determines a first award based on one or more selections by the player and subsequently modifies the first award to form a second award which is provided to the player. It should be appreciated that this embodiment does not enable the player to accept or reject any awards, but rather modifies one or more awards prior to providing any awards to the player.

In one alternative embodiment, the gaming device provides a plurality of elements or positions wherein each position is associated with an award. As described above, the award associated with each position is based on the value or multiplier associated with the position's selection group as well as the value or multiplier associated with the position's ranking. In this embodiment, the gaming device also provides a plurality of selections wherein one or more of the selections are associated with a terminator. The gaming device does not initially reveal which selections are associated with a terminator. In operation of this embodiment, the gaming device enables the player to pick one of the selections and the gaming device determines if the picked selection is associated with a terminator. If the picked selection is not associated with a terminator, the gaming device positions or places the picked selection to occupy one of the elements or positions of one of the selection groups. In different embodiments as described above, the gaming device places the picked selection at the lowest available ranking of the picked selection's associated selection group, the gaming device places the picked selection at one of the positions based on the picked selections associated ranking, the gaming device places the picked selection at one of the positions based on the picked selections associated selection group regardless of the rank of the position, or the gaming device randomly places the picked selection at one of the positions. The occupied element or position is associated with an award based on the value or multiplier of the selection group of the occupied position as well as the value or multiplier of the ranking of the occupied position. After placing the picked selection to occupy one of the elements or positions, the gaming device enables the player to pick another one of the selections and again determines if the picked selection is associated with a terminator as described above.

If the picked selection is associated with a terminator, the gaming device modifies the position of at least one of the picked selections. Alternatively, the gaming device modifies or moves the positions of a plurality of or each the picked selections. In different embodiments, the gaming device individually moves the positions of one, more or each of the picked selections to: another position within the same selection group (i.e., a different ranking); another position with the same ranking in a different selection group; another position with a different ranking in a different selection group or in any other suitable manner described above. In another embodiment, the gaming device removes at least one of the picked selections from it's currently occupied position (i.e. removed from the offer grid) and the gaming device modifies the positions of the remaining picked selections based on the removed selection. For example, if a picked selection which occupies the lowest ranked position of a selection group is removed, then any previously occupied higher ranked positions of the same selection group must be moved to or repositioned to the lowest ranked unoccupied position because in this embodiment, a higher ranked position of a selection group can only be occupied if each of the lower ranked positions of the selection group are also occupied.

After modifying the positions of one or more of the picked selections, the gaming device determines the modified award based on the awards or values associated with the modified positions of the picked selections. The gaming device provides the determined modified award to the player and ends the game.

In one alternative embodiment, the gaming device provides a plurality of elements or positions wherein each position is associated with an award or award component. As described above, the award components associated with each position is based on the award sub-component, such as the value or multiplier, associated with the position's selection group as well as the award sub-component, such as the value or multiplier, associated with the position's ranking. That is, each ranked position is associated with an award component wherein the award component is formed from award sub-components. For example, an award component is the product of a value of a position's selection group (first award sub-component) and the value associated with that position's ranking (second award sub-component). In this embodiment, the gaming device also provides a plurality of selections wherein one or more of the selections are associated with a terminator. In one embodiment, one or more terminators are each associated with an award, such as a value. The gaming device does not initially reveal which selections are associated with a terminator.

In operation of this embodiment, the gaming device enables the player to pick one of the selections and the gaming device determines if the picked selection is associated with a terminator. If the picked selection is not associated with a terminator, the gaming device positions or places the picked selection to occupy one of the elements or positions of one of the selection groups. In different embodiments as described above, the gaming device places the picked selection at the lowest available ranking of the picked selection's associated selection group, the gaming device places the picked selection at one of the positions based on the picked selections associated ranking, the gaming device places the picked selection at one of the positions based on the picked selections associated selection group regardless of the rank of the position, or the gaming device randomly places the picked selection at one of the positions. The occupied element or position is associated with an award component based on the value or multiplier of the selection group of the occupied position as well as the value or multiplier of the ranking of the occupied position. After placing the picked selection to occupy one of the elements or positions, the gaming device enables the player to pick another one of the selections and again determines if the picked selection is associated with a terminator as described above.

If the picked selection is associated with a terminator, the gaming device provides the player the award associated with the picked terminator. Additionally, the gaming device modifies the value or multiplier associated with one or more selection groups (i.e., one award sub-component) and/or modifies the value or multiplier associated with one or more rankings (i.e., another award sub-component).

In one embodiment, which value or multiplier is modified is based on which terminator is selected. For example, if one terminator is selected, the values or multipliers associated with one or more selection groups are modified, while if another terminator is selected, the values or multipliers associated with one or more rankings are modified. In different embodiments, which value(s) or modifier(s) are modified is predetermined, randomly determined, determined based on a probability, determined based on the player's status (such as determined through a player tracking system), determined based on the player's wager, or determined based on any other suitable method.

After modifying the values or multipliers associated with one or more selection groups and/or the values or multipliers associated with one or more rankings, the gaming device determines the modified award based on the awards or values associated with the modified positions of the picked selections. The gaming device provides the determined modified award to the player and ends the game.

Additional features and advantages of the present invention are described in, and will be apparent from, the following Detailed Description and the figures.

DETAILED DESCRIPTION

Figure 1A:
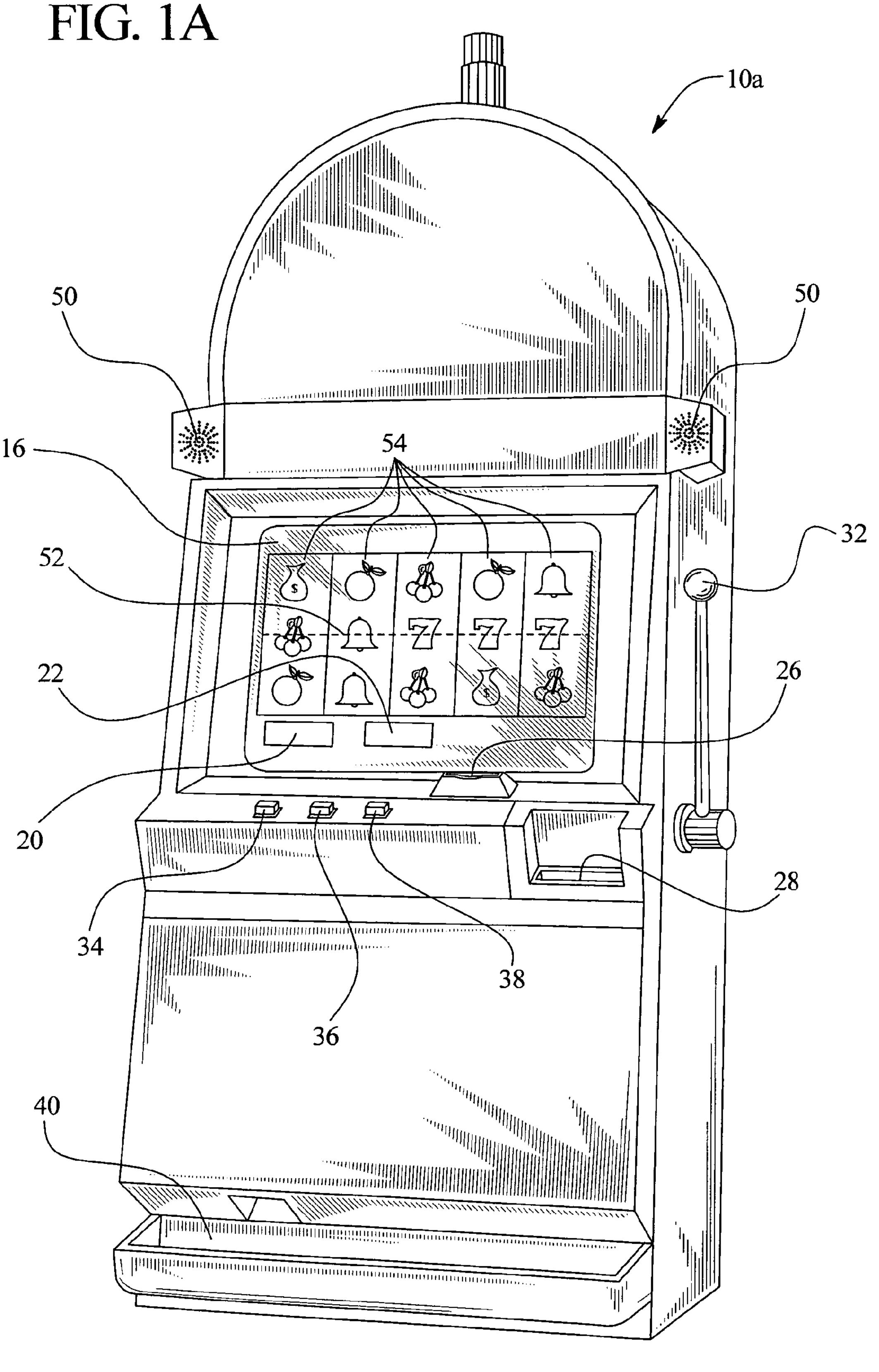
FIG. 1A is a front-side perspective view of one embodiment of the gaming device of the present invention.
Figure 1B:
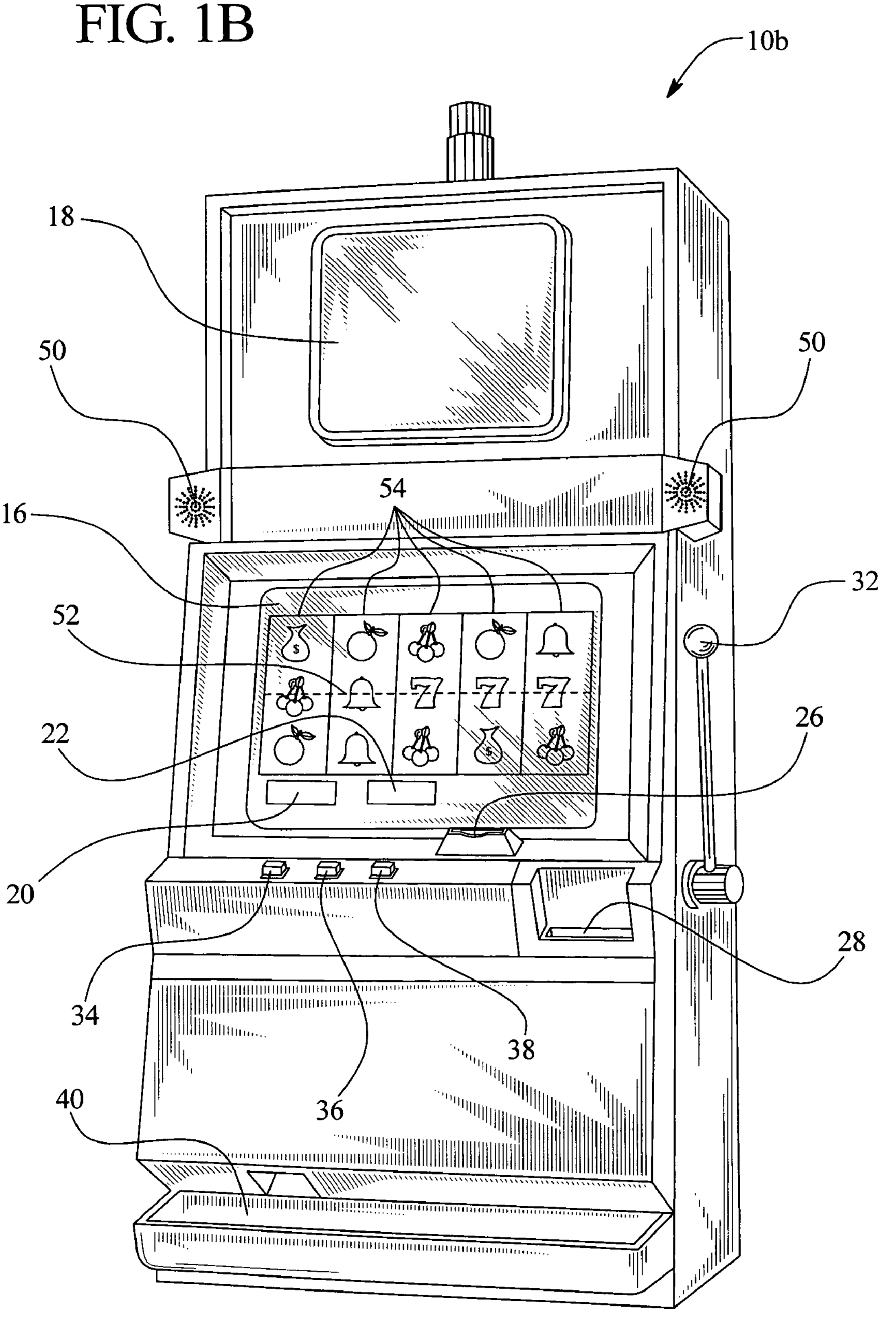
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
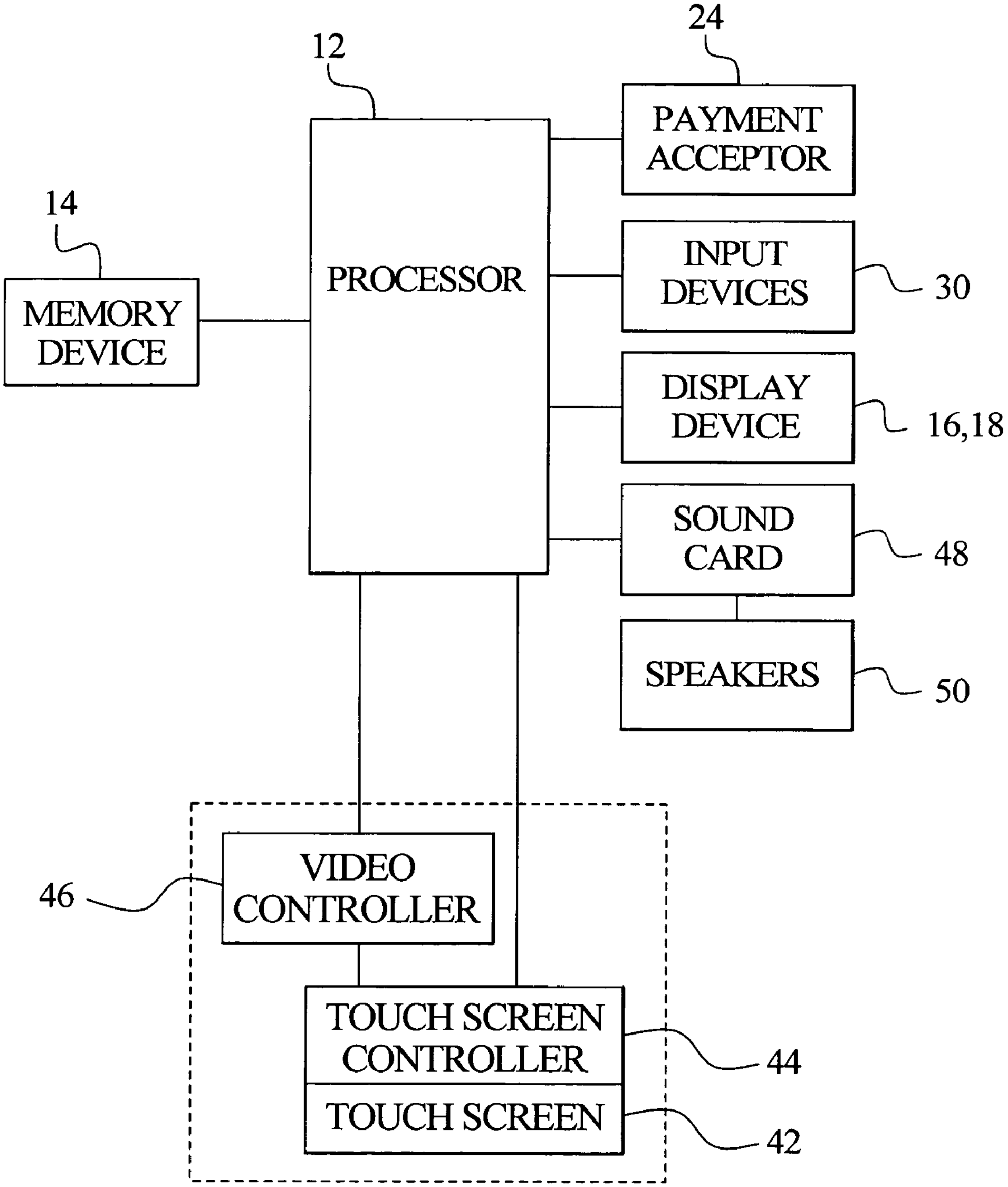
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
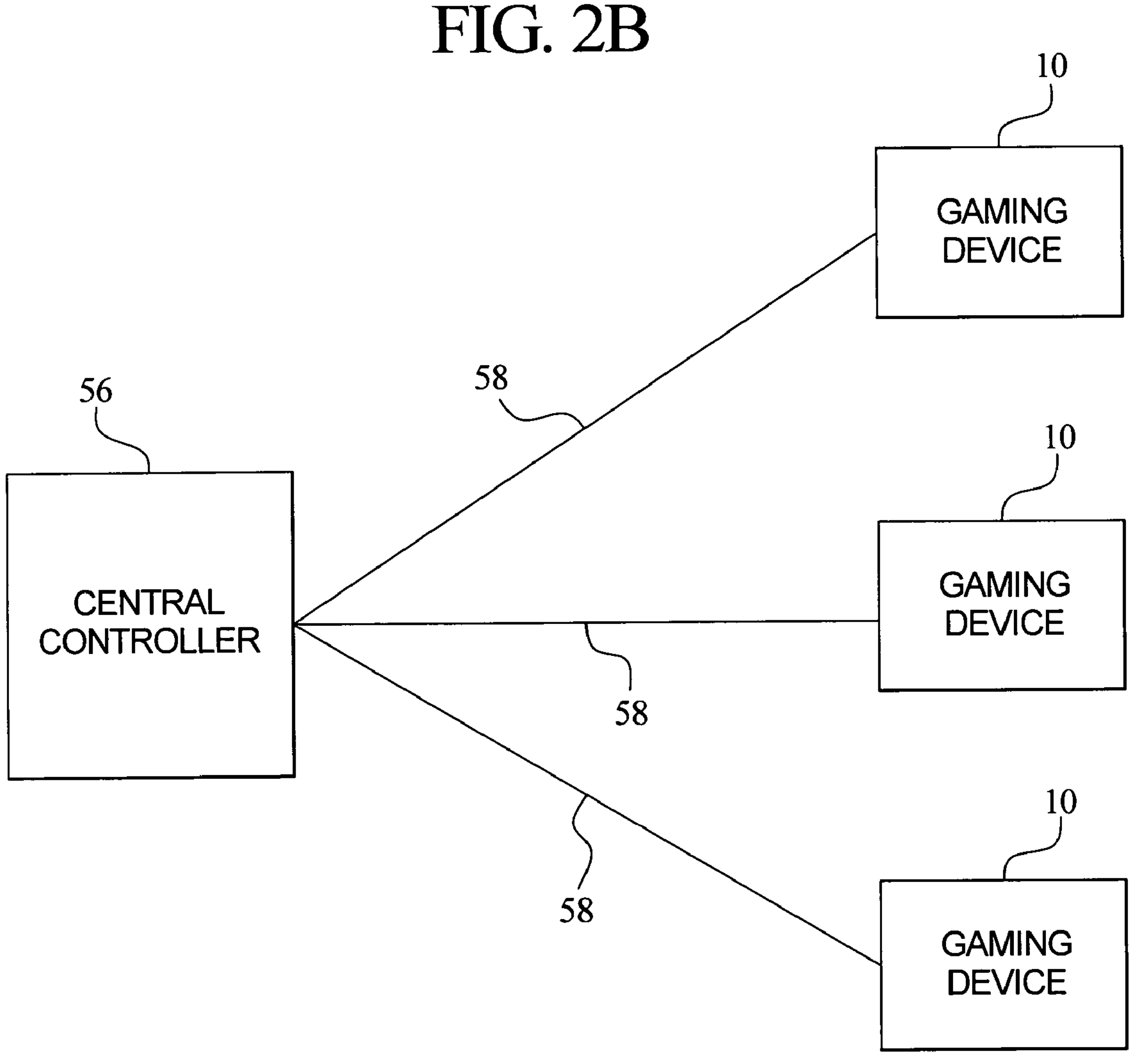
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Selection Game with Building Awards

Figure 3A:
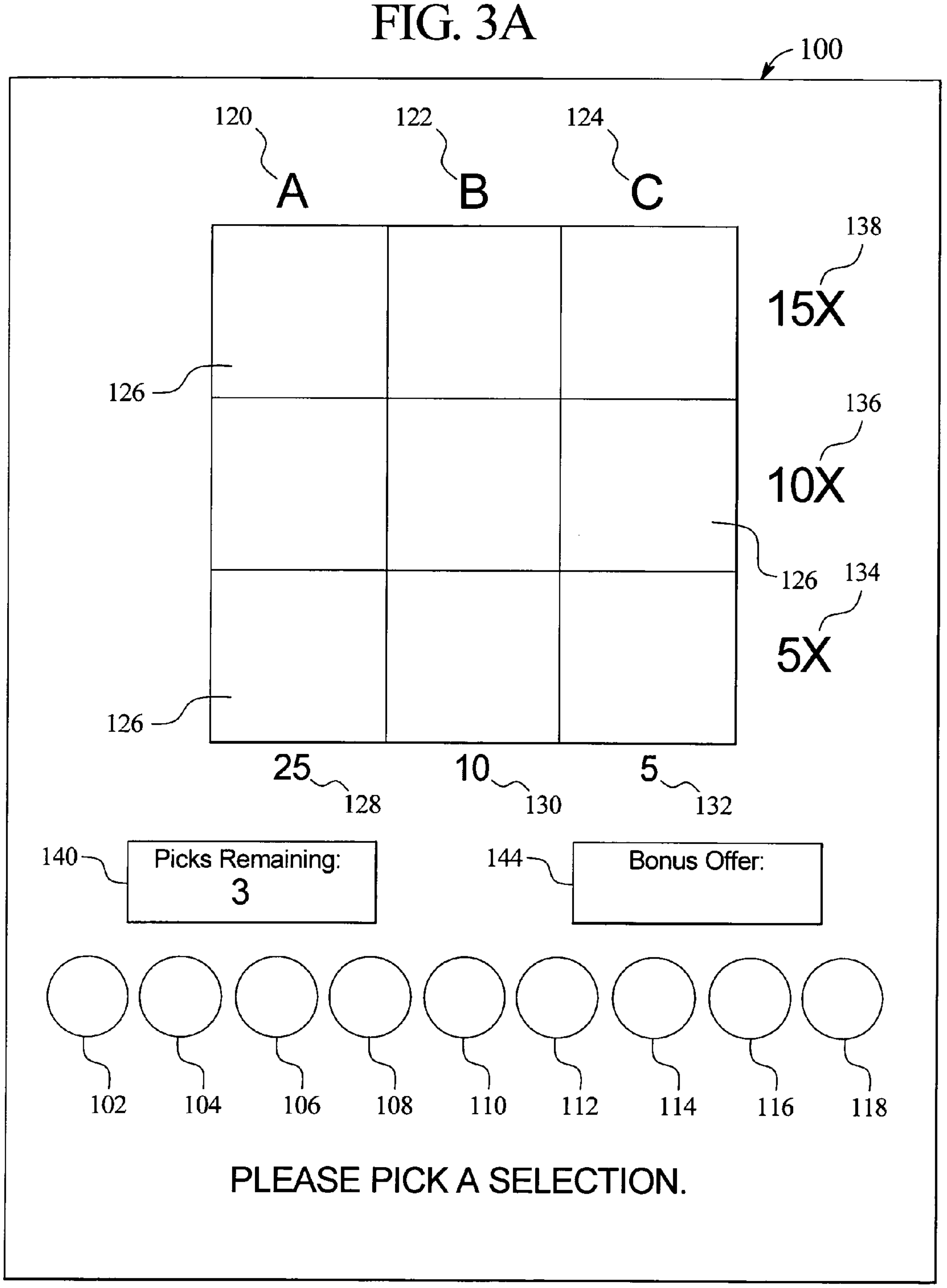
FIGS. 3A, 3B, 3C, 3D, 3E, 3F and 3G are front elevational views of one embodiment of the present invention illustrating a player obtaining an offer and rejecting the offer for another offer.

Referring now to FIG. 3A, in one embodiment of the present invention, the gaming device provides a screen or display 100 which enables a player to make selections to obtain or to be offered one or more offers. In one embodiment of the present invention, the gaming device provides a plurality of selection groups illustrated as selection groups “A,” “B” and “C” 120, 122 and 124, respectively. This embodiment includes three selection groups, however any suitable number of selection groups may be implemented in accordance with the present invention. In one embodiment, each selection group is associated with a value or modifier. In this case, selection group “A” 120 is associated with a value of twenty-five 128, selection group “B” 122 is associated with a value of ten 130 and selection group “C” is associated with a value of five 132.

In one embodiment, the value or modifier associated with each selection group is randomly determined each time the selection game is initiated. In another embodiment, the value or modifier associated with each selection group is predetermined. In another embodiment, the value or modifier associated with each selection group is selected from a range of values or modifiers. In another embodiment, a probability is associated with each value or modifier and each value or modifier is selected to be associated with a selection group based on it's associated probability.

Each selection group includes one or more elements or positions 126. Each element or position in each selection group is associated with a different ranking or otherwise ranked from a first or lowest position in the selection group to a last or highest position in the selection group. Each ranking is associated with a value or modifier, wherein the higher the ranking, the greater the associated value or modifier. In this case, the first or lowest ranking 134 is associated with a modifier of five, the second or intermediate ranking 136 is associated with a modifier of ten and the third or highest ranking 138 is associated with a modifier of fifteen.

In one embodiment, the value or modifier associated with each ranking is randomly determined each time the selection game is initiated. In another embodiment, the value or modifier associated with each ranking is predetermined. In another embodiment, the value or modifier associated with each ranking is selected from a range of values or modifiers. In another embodiment, a probability is associated with each value or modifier and each value or modifier is selected to be associated with a ranking based on it's associated probability.

Each position of each selection group is associated with a value or award. That is, since each position is included in a selection group (that is associated with a value or modifier) and each position is associated with a ranking within the selection group (that is associated with a value or modifier), each position is associated with a value or award that is based on these associated values. As described in more detail below, the value or award associated with each position is an offer component that may be combined with other offer components to form an offer.

In one embodiment, the selection groups and rankings are arranged as rows or columns of a grid configuration. In one embodiment, each column of the grid represents a selection group and each row of the grid represents a different ranking. In this embodiment, the lowest row represents the lowest ranking and the rankings increase sequentially as the rows increase. In this embodiment, the award or value associated with each position of the grid is based on the value of the column (i.e., the selection group) and the multiplier of the row (i.e., the ranking) that the position is located at on the grid. In another embodiment, each row of the grid represents a selection group and each column of the grid represents a different ranking. The present invention is not limited to a square or rectangular-shaped grid as illustrated in FIG. 3A. A variety of different grid shapes may be utilized to facilitate and enhance the enjoyment and entertainment objectives of the present invention.

In one embodiment, the gaming device also provides a plurality of selections represented as numbers 102, 104, 106, 108, 110, 112, 114, 116 and 118. In one embodiment, each selection is initially associated with a selection group. In one embodiment, the selection group initially associated with each selection is masked or otherwise not revealed to the player. In one embodiment, the number of selections associated with each selection group is the same number of positions or elements includes in that selection group. This embodiment includes nine selections, however any suitable number of selections may be implemented in accordance with the present invention. In another embodiment, each selection is not initially associated with a selection group. In this embodiment, each player picked selection is associated with a selection group when the selection is picked or selected by the player.

The gaming device also provides the player a number of picks of the selections, in this case three, which is displayed in a picks remaining display 140. The number of picks of selections may be predetermined or randomly determined. Alternatively, the number of picks may determined during play of the base game, determined based on the amount wagered or determined in any other suitable manner. The gaming device also provides a bonus offer display 144 that displays the total amount of all the currently revealed awards which will form an offer as described in more detail below.

As illustrated in FIG. 3A, the gaming device enables the player to pick one or more of the plurality of selections. Appropriate messages such as “PLEASE PICK A SELECTION” are preferably provided to the player visually, or through suitable audio or audiovisual displays. In an alternative embodiment. the gaming device picks one or more of the plurality of selections.

Figure 3B:
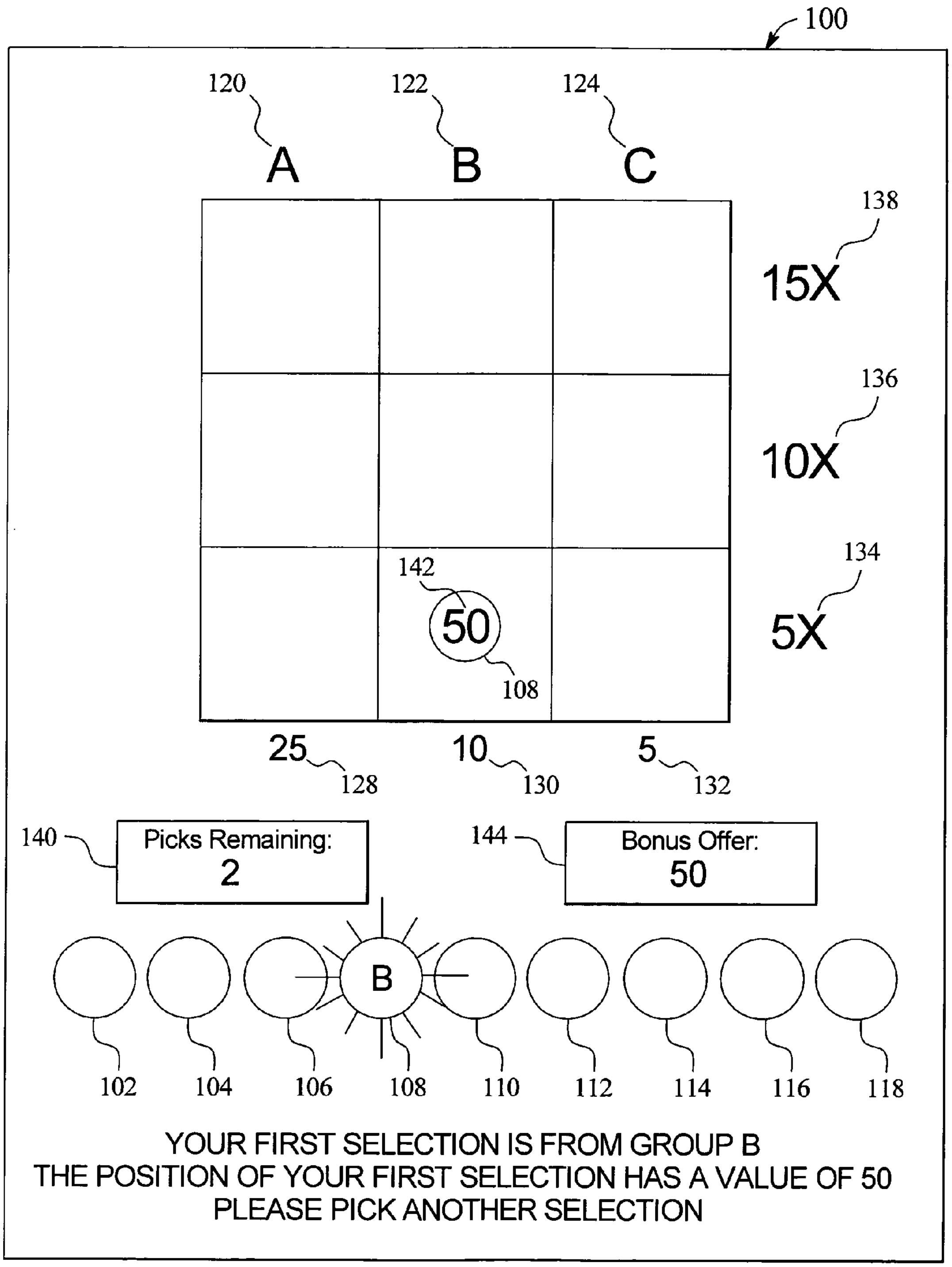

As seen in FIG. 3B, the player picks highlighted selection 108 which is revealed to be initially associated with selection group “B” 122. The player's picked selection is moved to or positioned at a position of the associated selection group. In this embodiment, the player's picked selection is moved to or positioned at the lowest ranking available or unoccupied position in the associated selection group. In this case, as the picked selection is associated with selection group “B”, the picked selection is moved to or positioned at the lowest ranking position (i.e., the bottom row) of the associated selection group. It should be appreciated that if a picked selection already occupies the lowest position, then the picked selection is positioned or placed at the second lowest ranked position (i.e., the next lowest row) of the associated selection group.

An award of fifty 142 that is associated with the picked selection's currently occupied position is revealed to the player. It should be appreciated that the award of fifty is based on the value of ten 130 associated with the position's column on the grid (i.e., the picked selection's associated selection group) and the modifier of five 134 associated with the position's row on the grid (i.e., the ranking of the currently occupied position). The bonus offer display 144 displays the offer amount of fifty which is the total amount of all the currently revealed awards. The picks remaining display 140 is subsequently reduced by one to reflect this pick. Appropriate messages such as “YOUR SELECTION IS FROM GROUP B,” “THE POSITION OF YOUR SELECTION HAS A VALUE OF FIFTY” and “PLEASE PICK ANOTHER SELECTION” are preferably provided to the player visually, or through suitable audio or audiovisual displays.

Figure 3C:
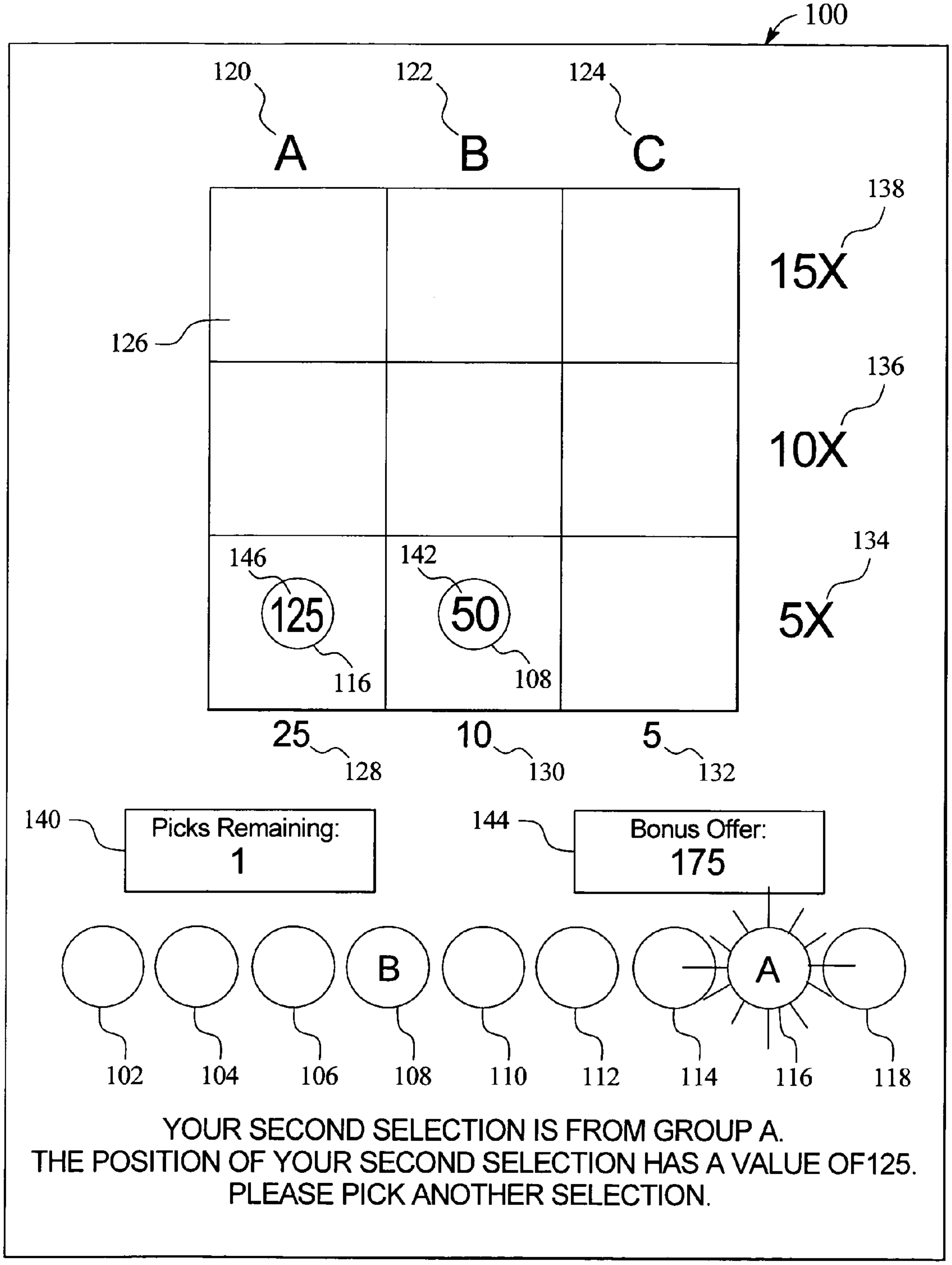

As seen in FIGS. 3B and 3C, as the player has at least one pick of a selection remaining, the gaming device enables the player to pick another selection. As illustrated in FIG. 3C, the player picks highlighted selection 116 which is revealed to be initially associated with selection group “A” 120. The picks remaining display 140 is subsequently reduced by one to reflect this pick. As described above, the player's picked selection is placed or positioned at the lowest ranking position (i.e., the lowest row) of the associated selection group. The value or award of one-hundred-twenty-five 146 associated with this position (based on the value of the position's selection group and the value of the position's ranking) is revealed to the player. The bonus offer display 144 is updated to display an offer award of one-hundred-seventy-five which is based on (i.e., the sum of) the total offer amounts of all the currently revealed awards. Appropriate messages such as "YOUR SELECTION IS FROM GROUP A," "THE POSITION OF YOUR SELECTION HAS A VALUE OF ONE-HUNDRED TWENTY-FIVE" and "PLEASE PICK ANOTHER SELECTION" are preferably provided to the player visually, or through suitable audio or audiovisual displays.

Figure 3D:
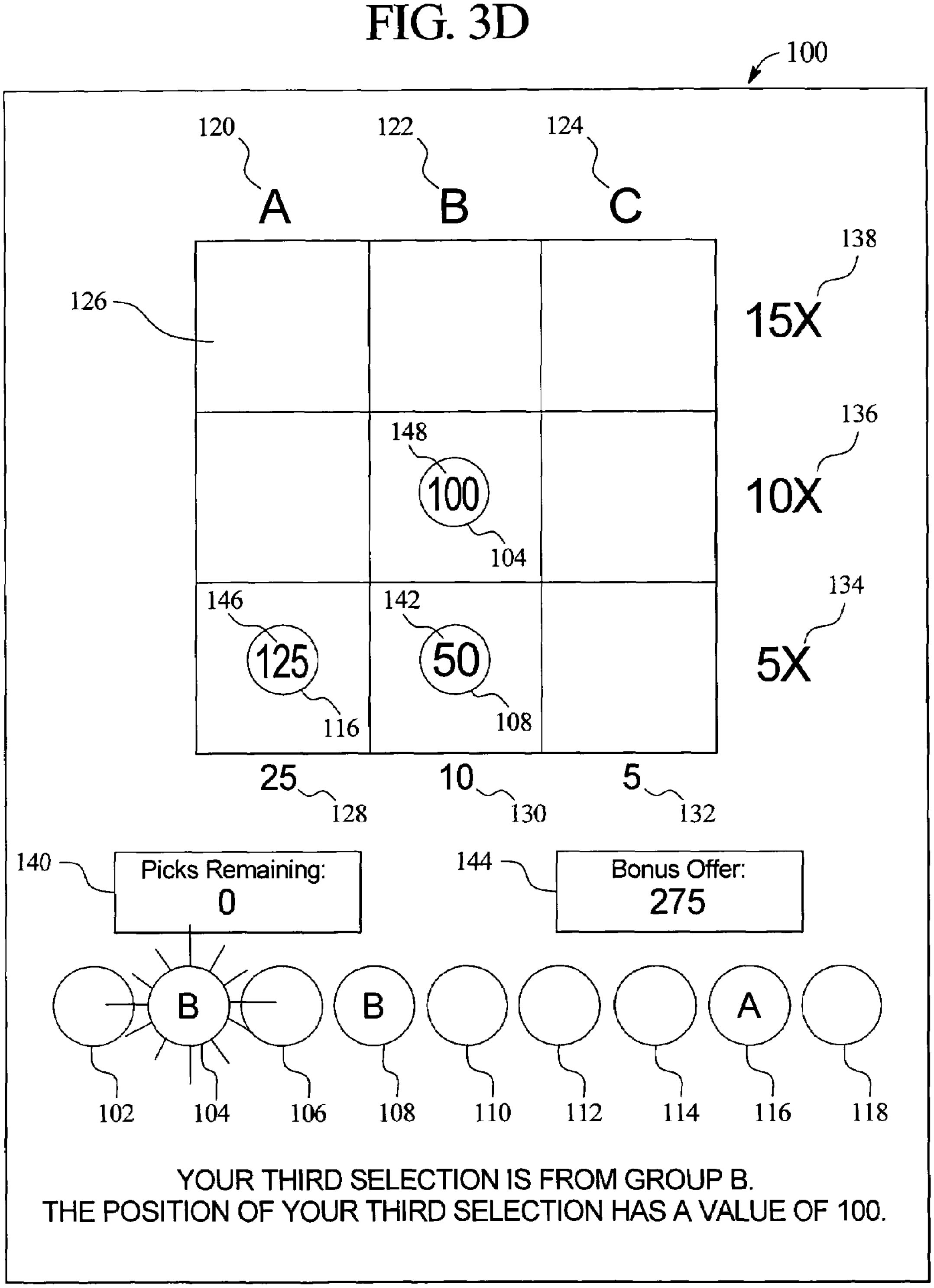

As seen in FIGS. 3C and 3D, as the player had at least one pick of a selection remaining, the gaming device enables the player to pick another selection. The picks remaining display 140 is reduced by one to reflect this pick. As illustrated in FIG. 3D, the player picks highlighted selection 104 which is revealed to be initially associated with selection group "B" 120. As described above, the player's picked selection is placed or positioned at the intermediate or second lowest ranked position (i.e., the middle row) of the associated selection group. That is, since a previously picked selection 108 already occupies the lowest ranked position, the currently picked selection 104 is moved to or positioned at the next available lowest ranked position. It should be appreciated that in this embodiment, as the modifiers associated with each ranking increase as the rankings of each position increase, the player will obtain a larger modifier and thus a larger award for stacking or building picked selections onto one another. The value or award of one-hundred 146 associated with this position is revealed to the player. The bonus offer display 144 is updated to display an offer award of one-hundred-seventy-five which is based on the total amount of all the currently revealed awards. Appropriate messages such as "YOUR SELECTION IS FROM GROUP B" and "THE POSITION OF YOUR SELECTION HAS A VALUE OF ONE-HUNDRED" are preferably provided to the player visually, or through suitable audio or audiovisual displays.

Figure 3E:
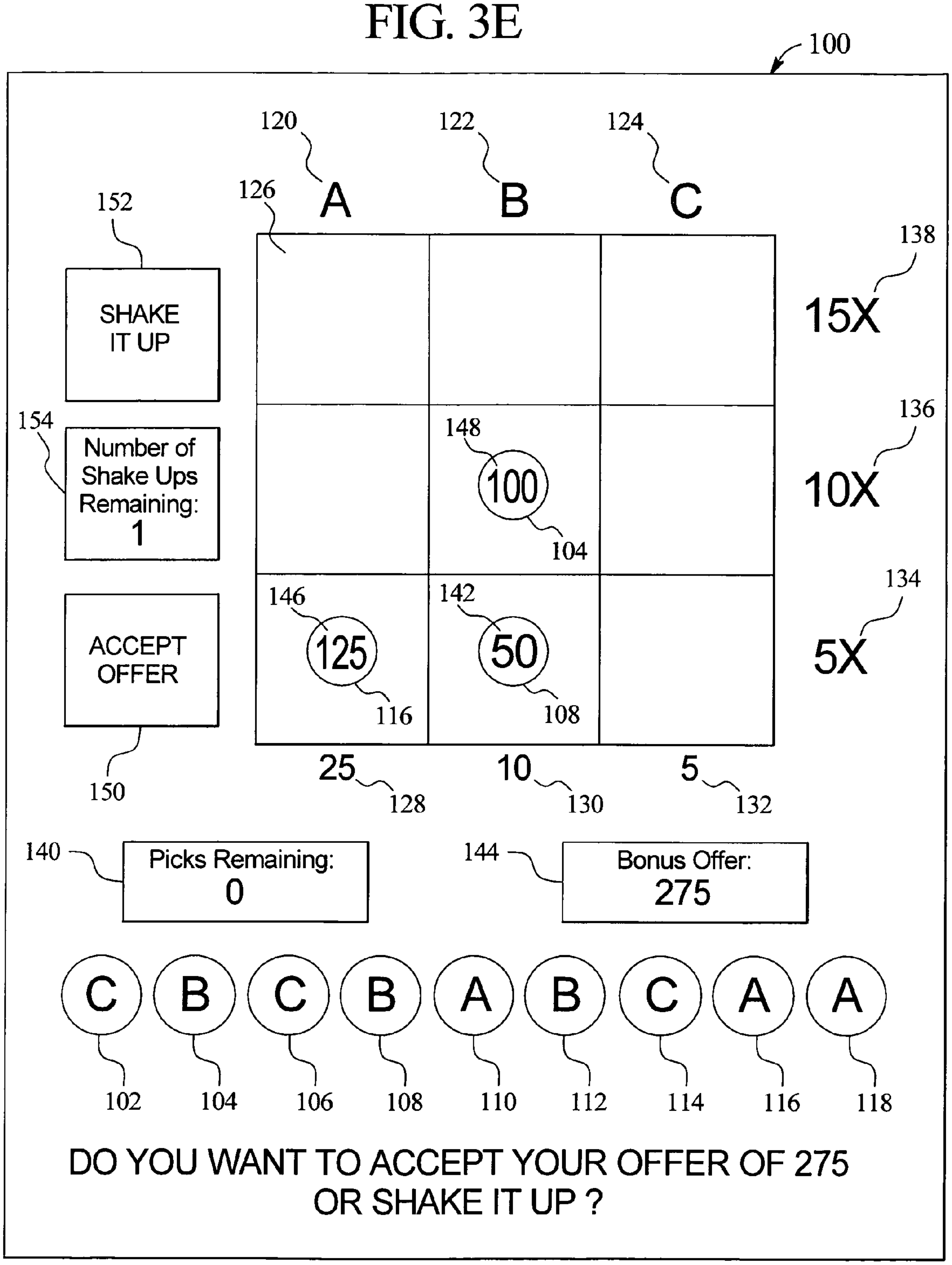

As illustrated in FIG. 3E, in one embodiment, when the player does not have at least one pick of a selection remaining and after each of the player picked selections is positioned or placed at the lowest available or unoccupied ranked position within the picked selection's associated selection group, the gaming device reveals the selection group that each unpicked selection is associated with.

As further illustrated in FIG. 3E, the amount displayed in the bonus offer amount is offered to the player. The gaming device enables the player to accept or reject the offered amount by using either an accept offer selector 150 and a reject offer selector or rearrange input 152 illustrated as a "SHAKE IT UP" selector. The gaming device provides the player a number of offers remaining which is displayed in the number of offers or "shake ups" remaining display 154. This number represents the number of times the player may reject an offer and accept a subsequent offer. In this embodiment, the number of offers remaining is one. In alternative embodiments, the number of offers remaining may be predetermined or randomly determined. Alternatively, the number of offers remaining may determined during play of the base game, determined based on the amount wagered or determined in any other suitable manner.

Figure 3F:
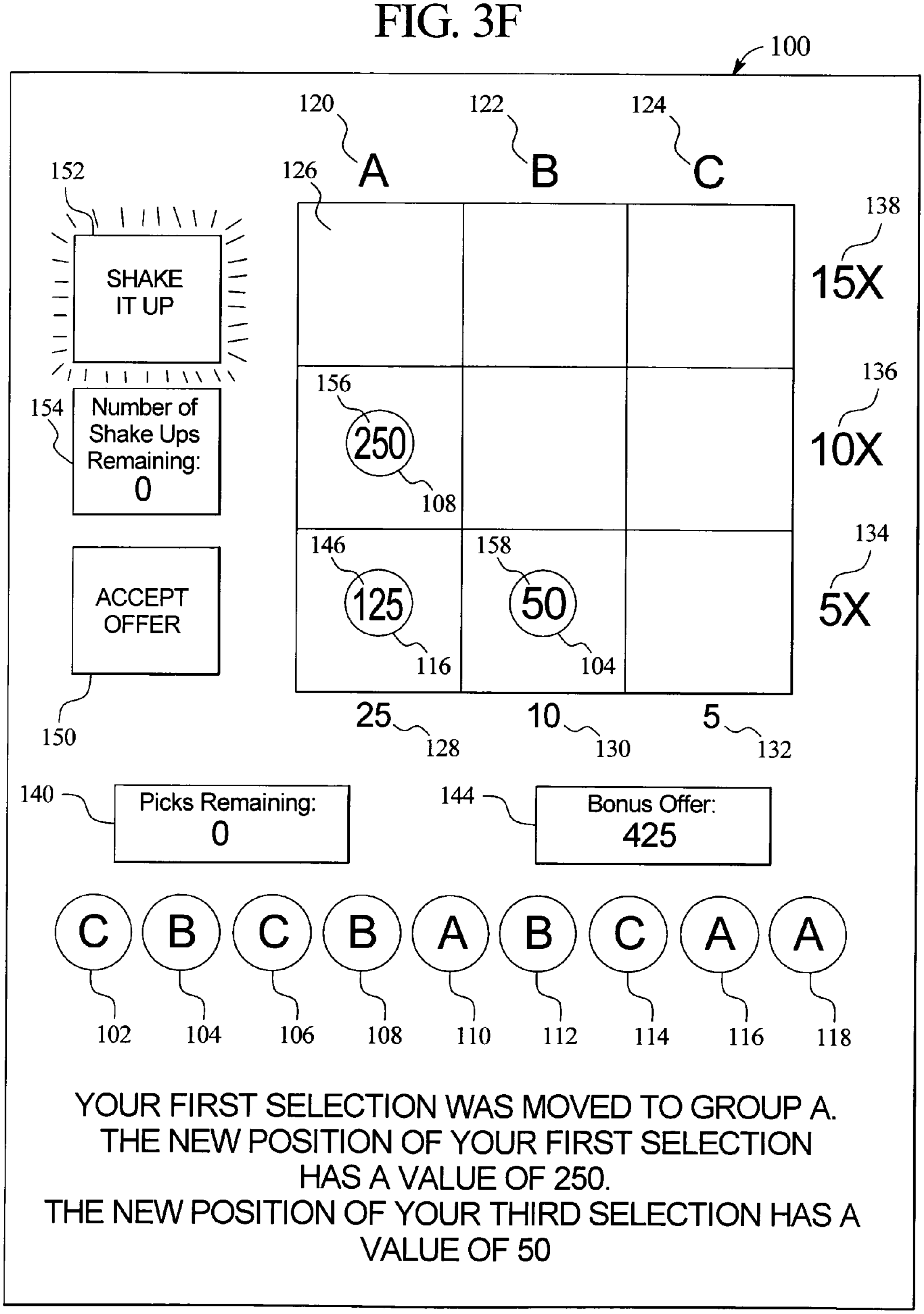

As illustrated in FIG. 3F, the player rejected the offer as indicated by the highlighted reject offer selector 152. Since the player rejected the offer, the gaming device modifies or moves at least one of the plurality of picked selections from the picked selection's currently occupied position. In this case, the gaming device moved the picked selection 108 to a position within selection group "A" 120. As described above, the player's picked selection is moved to or positioned at the intermediate or second lowest ranked position (i.e., the middle row) of the associated selection group. That is, since a previously picked selection 116 already occupies the lowest ranked position, the moved or modified selection 104 is moved to or positioned at the next available lowest ranked position. The award or value 156 of two-hundred-fifty which is associated with the new occupied position of picked selection 104 is revealed to the player.

Moreover, as further illustrated in FIG. 3F, since picked selection 108 was moved to another position of another selection group, the lowest ranked position of selection group "B" 122 becomes unoccupied. Accordingly, picked selection 104 which previously occupied the second lowest ranked position (i.e., the middle row) of selection group "B" is moved to or repositioned to the lowest ranked unoccupied position (i.e., the bottom row) of selection group "B". That is, in one embodiment before a higher ranked position of a selection group can be occupied, each of the lower ranked positions of the selection group must first be occupied. The award or value 158 of fifty which is associated with the new occupied position of picked selection 104 is revealed to the player. In another embodiment, one or more picked selections will remain in their initial positions even though a lower ranked position in the same selection group becomes unoccupied.

As seen in FIG. 3F, the bonus offer display 144 is updated to display an offer award of four-hundred-twenty-five which is based on the total amount of the revealed awards associated with the current positions of the picked selections. It should be appreciated that this bonus offer represents not only the addition of the value associated with the new occupied position of the moved selections, but also the removal or reduction of the value associated with the previously occupied position of the moved selections. The amount displayed in the bonus offer display forms a subsequent offer that the gaming device enables the player to accept or reject as described above. The offers remaining display 154 is subsequently reduced by one to reflect this subsequent offer. Appropriate messages such as "YOUR SELECTION WAS MOVED TO GROUP A" and "THE NEW POSITION OF YOUR SELECTION HAS A VALUE OF TWO-HUNDRED FIFTY" are preferably provided to the player visually, or through suitable audio or audiovisual displays.

In one embodiment, the position of each picked selection can be modified or moved to another position within the same selection group that the picked selection was initially associated with. In another embodiment, one or more positions are each associated with one or more modified positions. In this embodiment, if a position is currently occupied and the selection occupying the position is moved or modified to another position, then the selection will be modified or moved to one of the modified positions associated with the currently occupied position. For example, if a first selection is currently occupying the lowest ranking position of a first selection group and the lowest ranking position of the first selection group is associated with the highest ranking position of a second selection group, then if the first selection is modified or moved to another position, the first selection will be modified or moved to the associated highest ranking position of the second selection group. In another embodiment, the position of each picked selection can be modified or moved to any other position in any of the selections groups. It should be appreciated that in the embodiment wherein each picked selection is positioned or placed at the lowest ranking position of the associated selection group, even after the picked selections are modified or moved the lowest ranking position of each selection group must be occupied before any other position of that selection group may be occupied.

Figure 3G:
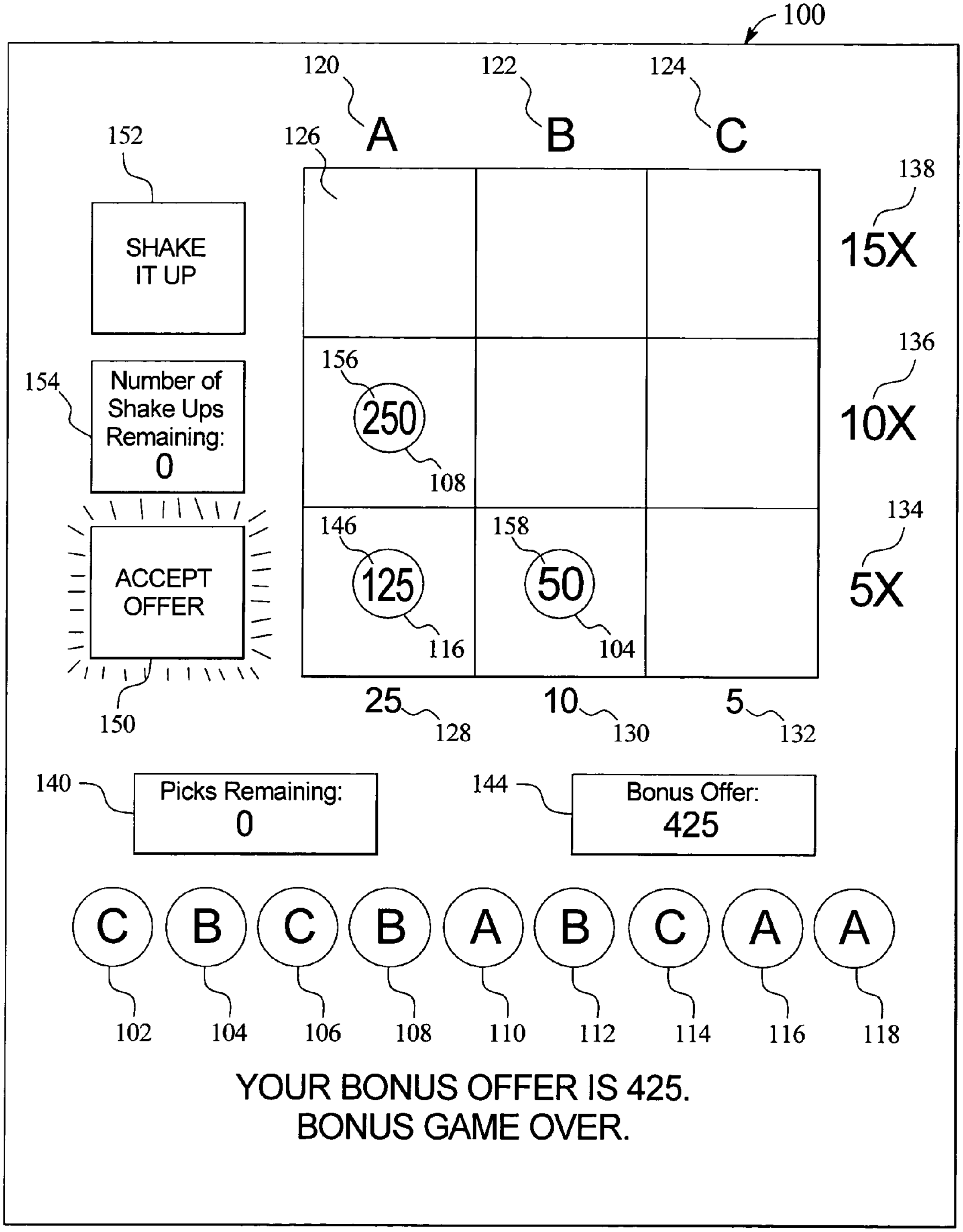

As illustrated in FIG. 3G, since the player has no offers remaining, the player must choose to accept the subsequent offer as indicated by the highlighted "Accept Offer" selector 152. Accordingly, the subsequent offer is provided to the player and the selection game ends. Appropriate messages such as "YOUR BONUS OFFER IS 425" and "BONUS GAME OVER" are preferably provided to the player visually, or through suitable audio or audiovisual displays. In another embodiment, had the player have at least one offer remaining 154, the player could have rejected this offer and the gaming device would have moved or repositioned at least one of the selections from an occupied position to another position as described above.

In an alternative embodiment, each selection is associated with a specific position of one of the selection groups. In this embodiment, the picked selection is positioned at the associated position. It should be appreciated that since each selection is associated with a specific position of a selection group, each picked selection will not automatically occupy the lowest ranked unoccupied position of the picked selections associated selection group. Moreover, in this embodiment, if the player rejects an offer and one of the picked selections is moved or repositioned to another position, the picked selection will not automatically occupy the lowest ranked unoccupied position of the picked selections modified selection group. In another embodiment, although each picked selection will not occupy the lowest ranked unoccupied position of the picked selections initially associated selection group, if the player rejects an offer and the picked selection is moved, then the picked selection will, as described above, occupy the lowest ranked unoccupied position of the selection group that the picked selection is moved to.

In an alternative embodiment, each selection group is not associated with a value or modifier. In this embodiment, each selection is associated with a value or modifier. As the selections are moved or modified, the value associated with the moved selection is modified by the value or modifier associated with the ranking of the position the selection is moved to. In this embodiment, if a selection is moved to another position in another selection group, but the other position is associated with the same ranking, then the player's offer will not be altered or changed. In another embodiment, each selection group is associated with a value but each ranking is not associated with a value or modifier. In this embodiment, as the selections are moved or modified, the player's offer is modified or altered based only on the selection group of the position that the selection currently occupied. In this embodiment, if a selection occupies the highest ranking position of a selection group or the lowest ranking position of the selection group, the player's offer will only be altered or changed by the value associated with the position's selection group.

In another embodiment, each ranking is associated with a value. In this embodiment, as more than one position associated with each selection group are occupied, the player's offer is increased by the value associated with the ranking of each of the occupied positions.

In an alternative embodiment, if the player rejects an offer, then at least one of the picked selections is removed from it's currently occupied position (i.e. removed from the offer grid) and the player is enabled to pick at least one of the remaining non-picked selections to replace the removed selection. The picked selection is moved to, positioned at or displayed to occupy the lowest available ranked position of the selection group associated with the picked selection as described above.

Referring generally to FIGS. 4A to 4D, in an alternative embodiment, the game disclosed herein is implemented as a selection game without the offer/acceptance features described above. In this embodiment, the gaming device provides a plurality of positions (which are associated with a plurality of awards) and a plurality of selections as described above. In one embodiment, one or more of the selections are each associated with a terminator. In this embodiment, the gaming device enables the player to pick one of the selections and the gaming device determines if the picked selection is associated with a terminator. If the picked selection is not associated with a terminator, the gaming device positions or places the picked selection to occupy one of the elements or positions of one of the selection groups or sets. The gaming device enables the player to pick another one of the selections and again determines if the picked selection is associated with a terminator. If the picked selection is associated with a terminator, the gaming device modifies the position of at least one of the picked selections. After modifying the positions of one or more of the picked selections, the gaming device determines the modified award based on the awards or values associated with the modified positions of the picked selections. The gaming device provides the determined modified award to the player and ends the game.

Figure 4A:
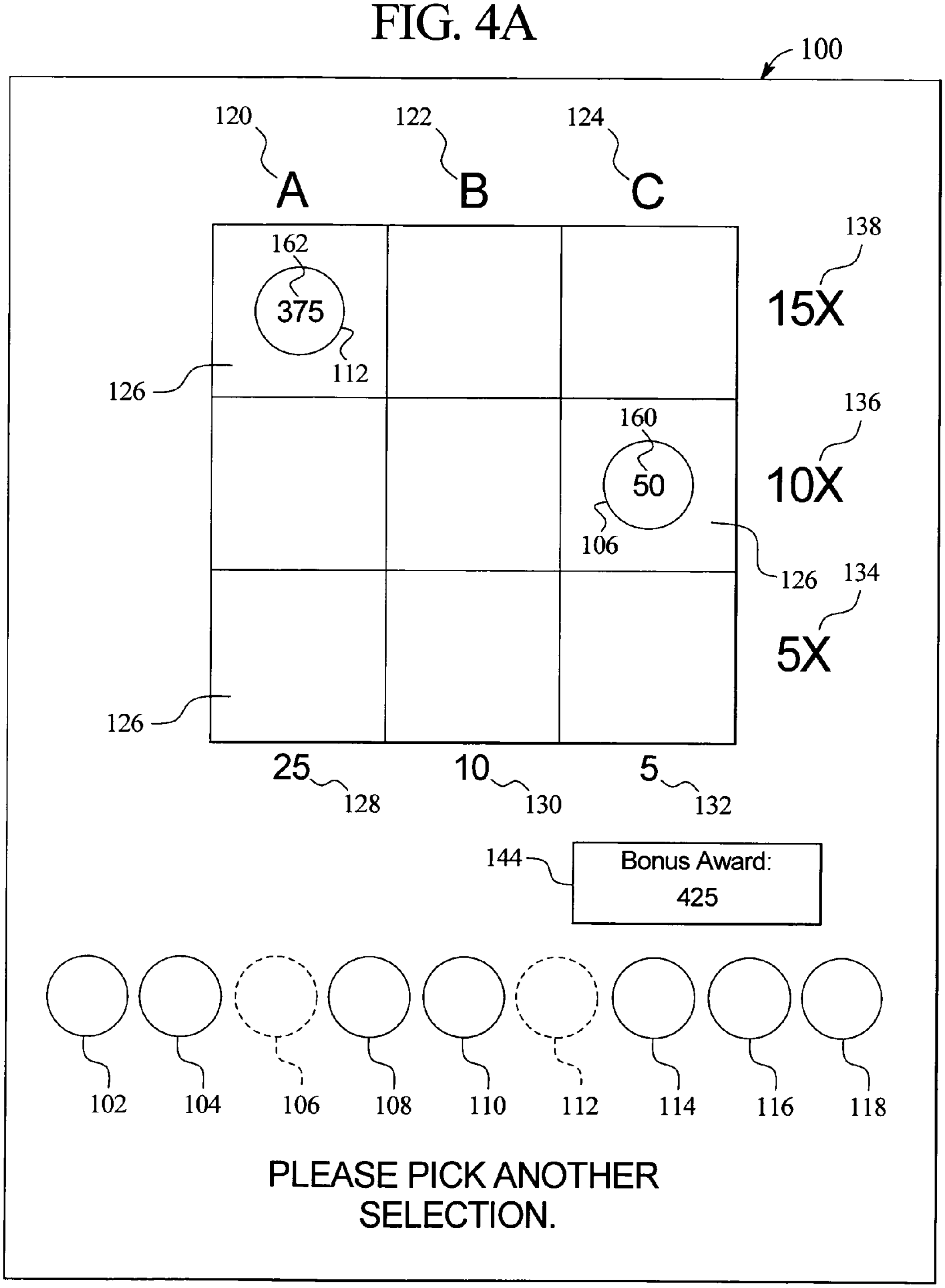
FIGS. 4A, 4B, 4C and 4D are front elevational views of an alternative embodiment illustrating an award which is formed and subsequently modified based on the selection of a terminator.

FIG. 4A illustrates this alternative embodiment after the player previously picked selections 106 and 112 and the gaming device randomly placed selections 106 and 112 at positions on the grid. In this example, after determining that selection 106 was not associated with a terminator, the gaming device randomly placed selection 106 in selection group C 124 (associated with a value of five) with an intermediate ranking 136 (associated with a multiplier of ten) to form an initial award of fifty 160. Additionally, after determining that selection 112 was not associated with a terminator, the gaming device randomly placed selection 112 in selection group A 120 (associated with a value of twenty-five) with a high ranking 138 (associated with a multiplier of fifteen) to form an initial award of three-hundred-seventy-five 162. In this example, as neither of the previously picked selections 106 or 112 are associated with a terminator, the gaming device enables the player to pick another selection. Appropriate messages such as "PLEASE PICK ANOTHER SELECTION" may be provided to the player visually, or through suitable audio or audiovisual displays.

In one alternative of this embodiment, each selection is associated with a selection group and the gaming device places the picked selection at the lowest available ranking of the picked selection's associated selection group or set. In another alternative of this embodiment, each selection is associated with a selection group and the gaming device places the picked selection at one of the ranked positions of the picked selection's associated selection group. In another alternative of this embodiment, each selection is associated with a ranking and the gaming device places the picked selection at one of the positions with the same ranking as the picked selection's associated ranking. In another alternative of this embodiment, each selection is associated with a ranking and a selection group and the gaming device places the picked selection at the position which corresponds to the associated ranking and selection group of the picked selection.

Figure 4B:
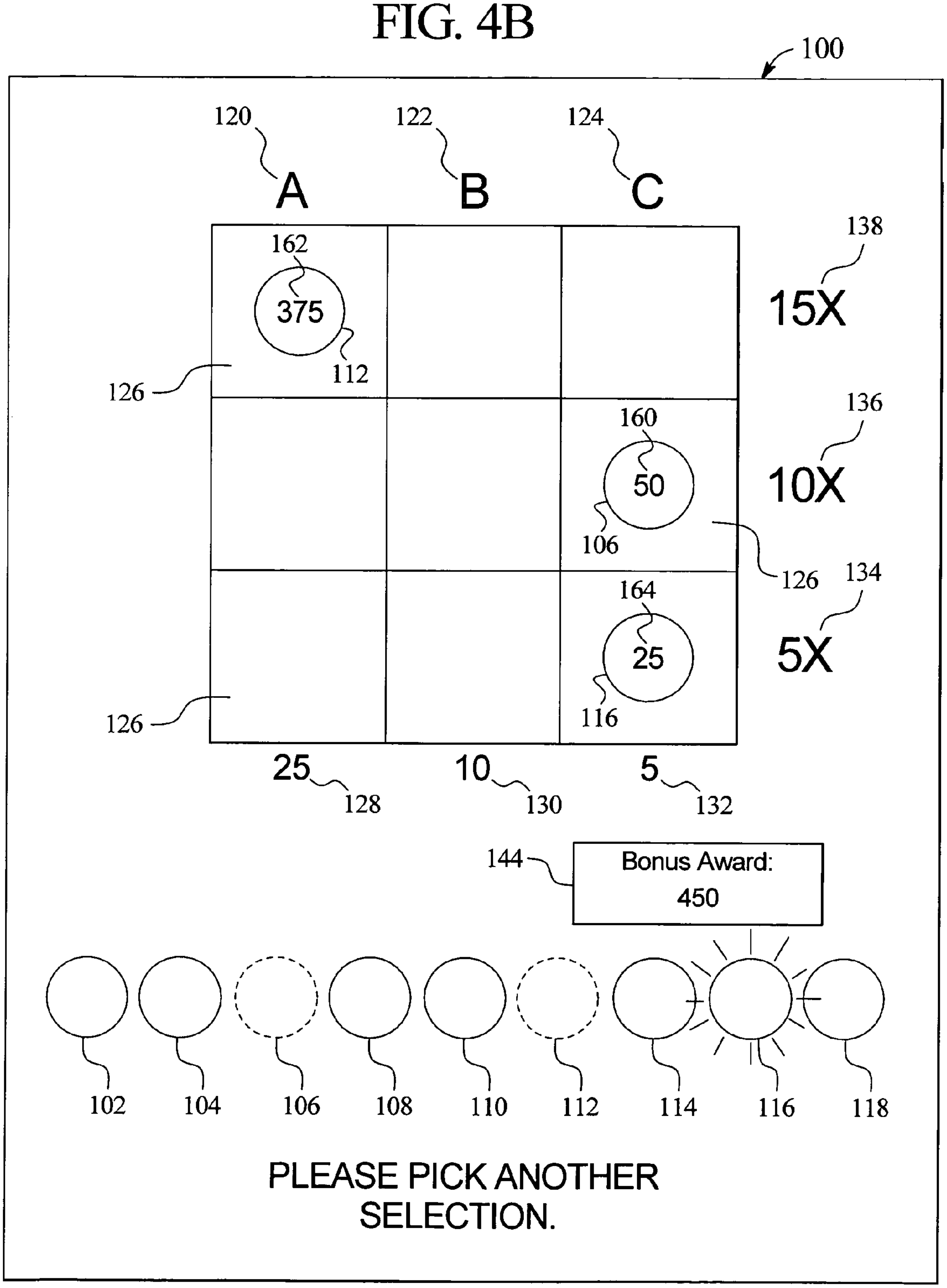

As illustrated in FIG. 4B, the player next picked highlighted selection 116. After determining that selection 116 was not associated with a terminator, the gaming device randomly placed selection 116 in selection group C 124 (associated with a value of five) with a low ranking 134 (associated with a multiplier of five) to form an initial award of twenty-five 164. It should be appreciated that previously picked selections 106 and 112 are shown in phantom to indicate that they cannot be selected again by the player. In this embodiment, since none of the previously picked selections are associated with a terminator, the gaming device enables the player to pick another selection. Appropriate messages such as "PLEASE PICK ANOTHER SELECTION" may be provided to the player visually, or through suitable audio or audiovisual displays.

Figure 4C:
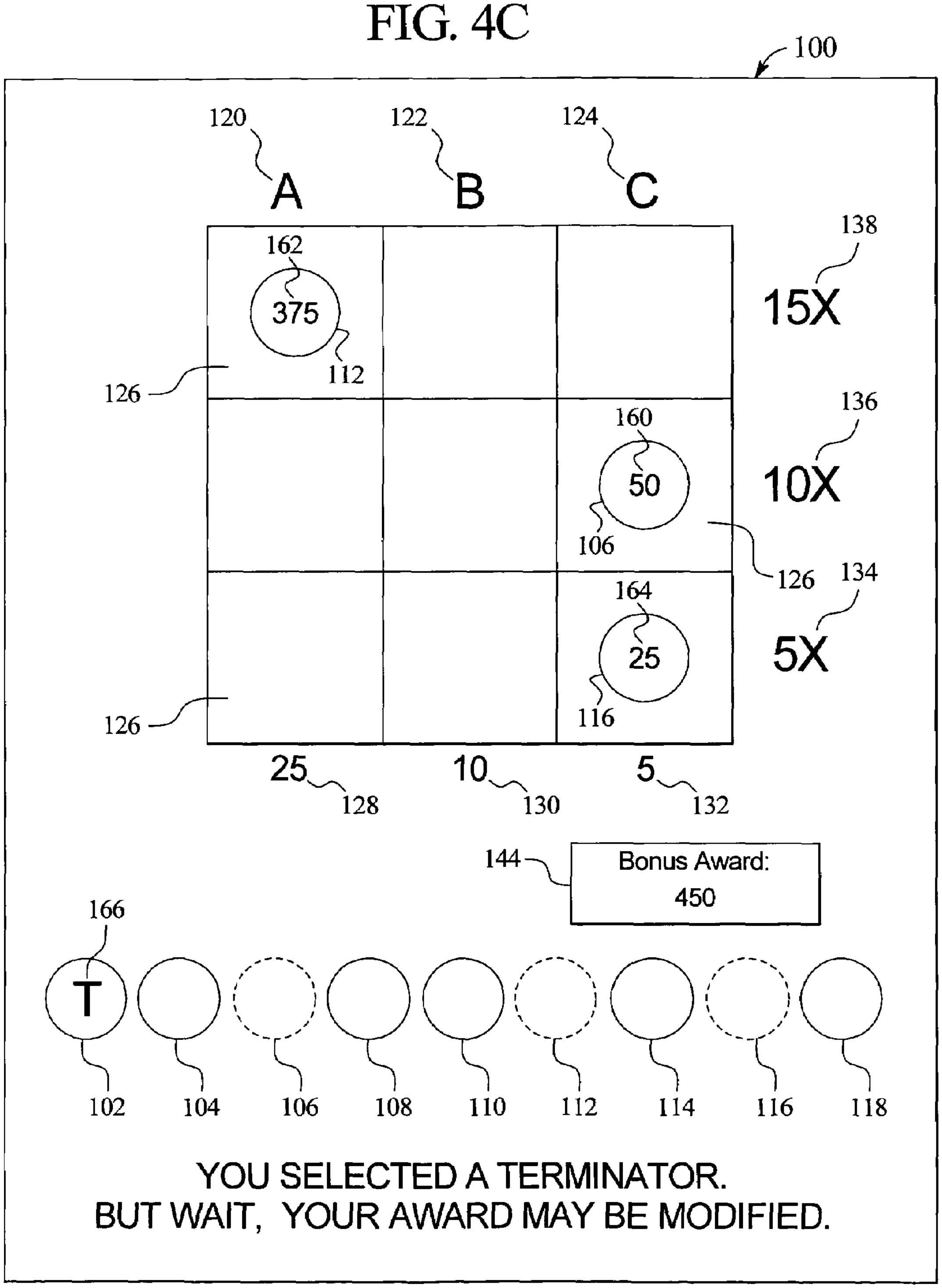

As seen in FIG. 4C, the player next picked highlighted selection 102 which is revealed to be associated with a terminator 166. Once a terminator is revealed, the player may no longer pick any selections and the gaming device modifies the positions of one or more of the picked selections. Appropriate messages such as "YOU SELECTED A TERMINATOR" and "BUT WAIT, YOUR AWARD MAY BE MODIFIED" may be provided to the player visually, or through suitable audio or audiovisual displays.

Figure 4D:
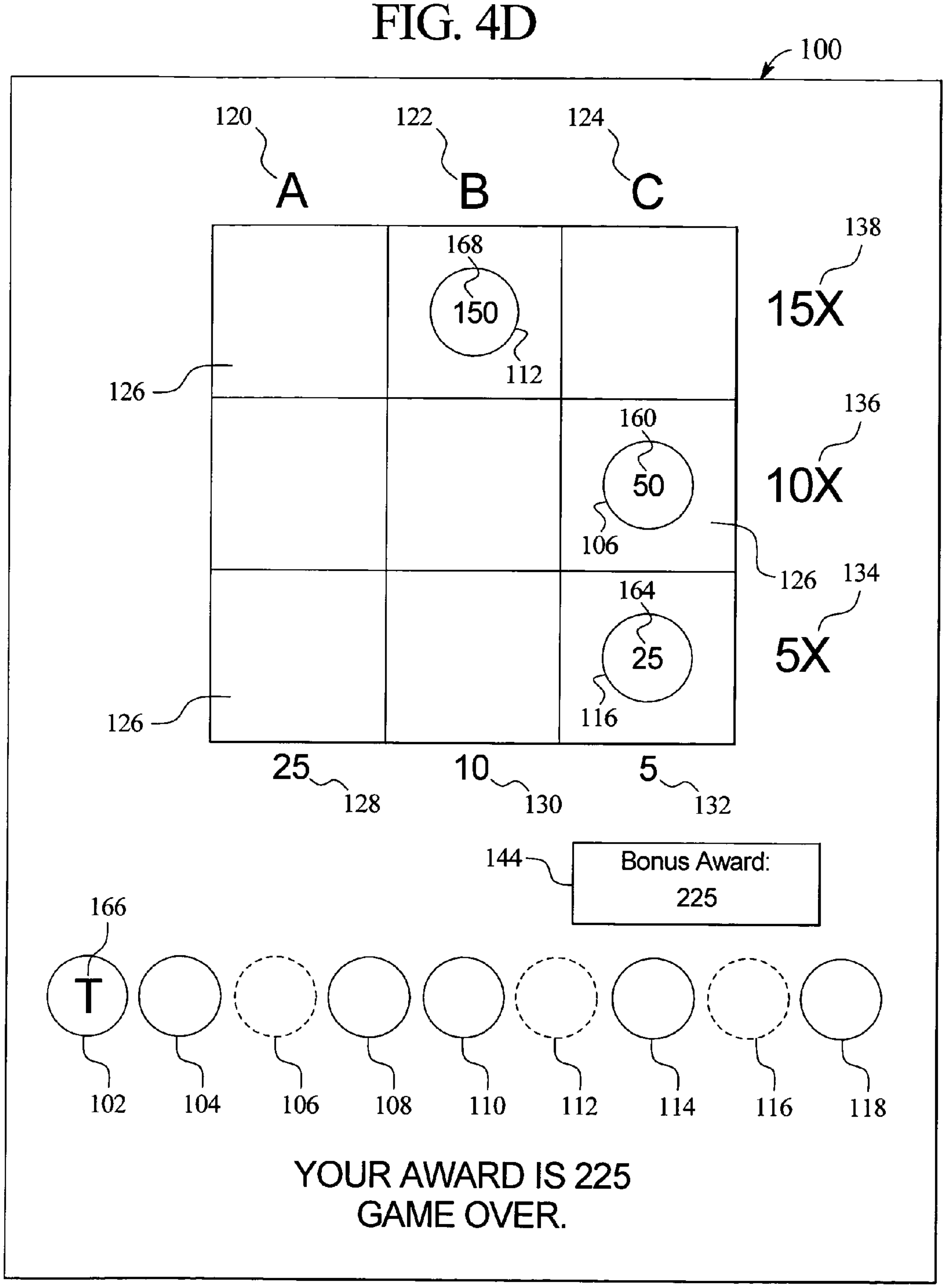

As seen in FIG. 4D, after a terminator is revealed, the gaming device modified the positions of the previously picked selections by moving selection 112 from the highest ranked position in one selection group 120 to the highest ranked position in another selection group 122. Accordingly, as each selection group is associated with a different value (even though the modifier associated with the ranking remained the same), the initially formed award of three-hundred-seventy-five for selection 112 is modified to one-hundred-fifty 168. A new award of two-hundred-twenty-five is formed based on the modified award(s) and any remaining unmodified initial awards. The new award is provided to the player and the game ends. Appropriate messages such as "YOUR AWARD IS 225" and "GAME OVER" may be provided to the player visually, or through suitable audio or audiovisual displays.

In an alternative embodiment, the gaming device modifies the positions of one or more of the picked selections after a plurality of terminators have been revealed. In another alternative embodiment, after a first terminator is revealed, the gaming device modifies the positions of one or more of the picked selections and enables the player to pick at least another selection until a second terminator is revealed. In this embodiment, when the second terminator is revealed, the gaming device again modifies the previously modified positions of one or more of the picked selections.

In an alternative to this embodiment (not shown), the gaming device modifies or moves the position of one, more or each of the picked selections to another position within the same selection group (i.e., a different ranking). In another alternative to this embodiment, the gaming device modifies or moves the position of one, more or each of the picked selections to another position with the same ranking in a different selection group. In another alternative to this embodiment, the gaming device modifies or moves the position of one, more or each of the picked selections to another position with a different ranking in a different selection group.

In another alternative to this embodiment, the gaming device removes at least one of the picked selections from it's currently occupied position (i.e. removed from the offer grid). In this embodiment, the gaming device modifies the positions of the remaining picked selections based on the removed selection such that if a picked selection which occupies the lowest ranked position of a selection group is removed, then any previously occupied higher ranked positions of the same selection group must be moved to or repositioned to the lowest ranked unoccupied position. For example, in FIG. 4D, if selection 116 is removed, then selection 106 would be repositioned or moved to the lowest position of it's currently occupied selection group.

In another alternative embodiment, the gaming device randomly places the selections at different positions when they are picked (regardless of if a lower ranked position of the same selection group is occupied) and after a selection associated with a terminator is picked, the gaming device moves or modifies the positions of one or more of the selections wherein each selection must occupy the lowest ranked unoccupied position of that selection's respective selection group.

Figure 5A:
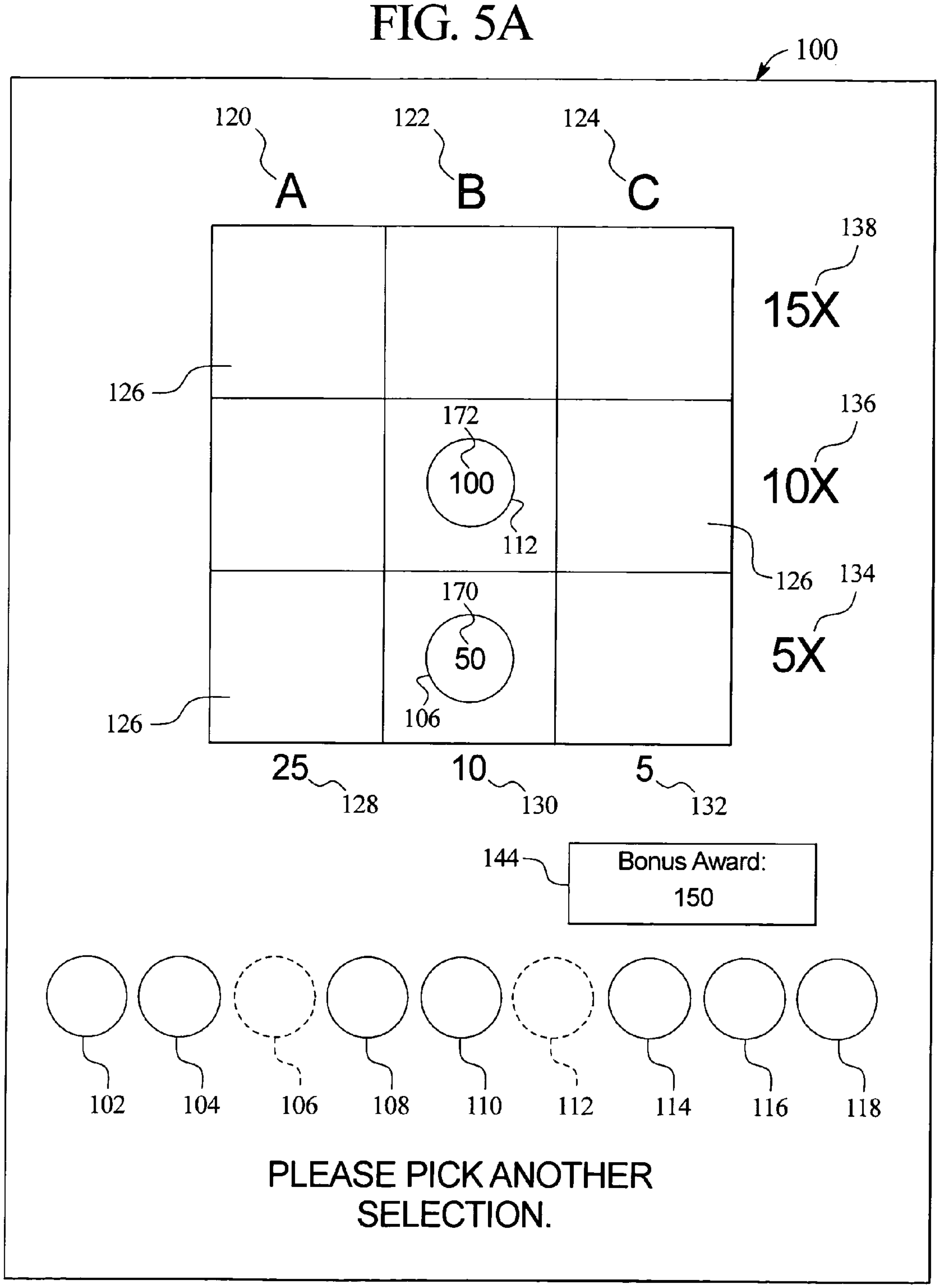
FIGS. 5A, 5B, 5C and 5D are front elevational views of an alternative embodiment illustrating an award which is formed and subsequently modified based on the modification of the values associated with the selection groups.

Referring generally to FIGS. 5A to 5D, in an alternative embodiment, the game disclosed herein is implemented as a selection game without the offer/acceptance features described above. In this embodiment, the gaming device provides a plurality of ranked positions and a plurality of selections as described above. One or more ranked positions are each associated with an award component which is formed from the award sub-components associated with the ranking and selection group of that ranked position. That is, as illustrated in FIG. 5A, an award component is the product of a value of a position's selection group (first award sub-component) and the value associated with that position's ranking (second award sub-component). In one embodiment, one or more of the selections are each associated with a terminator. In another embodiment, each terminator is associated with an award, such as a value. The gaming device does not initially reveal which selections are associated with a terminator.

In one such embodiment, the gaming device enables the player to pick one of the selections and the gaming device determines if the picked selection is associated with a terminator. If the picked selection is not associated with a terminator, the gaming device positions or places the picked selection to occupy one of the elements or positions of one of the selection groups or sets. The gaming device enables the player to pick another one of the selections and again determines if the picked selection is associated with a terminator. In one embodiment, if the picked selection is associated with a terminator, the gaming device modifies the value or multiplier associated with one or more selection groups and/or modifies the value or multiplier associated with one or more rankings. After modifying the values or multipliers associated with one or more selection groups and/or the values or multipliers associated with one or more rankings, the gaming device determines the modified award based on the awards or values associated with the positions of the picked selections. The gaming device provides the determined modified award to the player and ends the game.

FIG. 5A illustrates this alternative embodiment after the player previously picked selections 106 and 112 and the gaming device placed selections 106 and 112 at positions on the grid. In this example, after determining that selection 106 was not associated with a terminator, the gaming device placed selection 106 in selection group B 122 (associated with a value of ten) with an low ranking 134 (associated with a multiplier of five) to form an initial award of fifty 170. Additionally, after determining that selection 112 was not associated with a terminator, the gaming device placed selection 112 in selection group B 122 (associated with a value of ten) with an intermediate ranking 136 (associated with a multiplier of ten) to form an initial award of one-hundred 172. In this example, as neither of the previously picked selections 106 or 112 are associated with a terminator, the gaming device enables the player to pick another selection. Appropriate messages such as "PLEASE PICK ANOTHER SELECTION" may be provided to the player visually, or through suitable audio or audiovisual displays.

In one embodiment, each selection is associated with a selection group and the gaming device places the picked selection at the lowest available ranking of the picked selection's associated selection group or set. In another embodiment, each selection is associated with a selection group and the gaming device places the picked selection at one of the ranked positions of the picked selection's associated selection group. In alternative embodiment, each selection is associated with a ranking and the gaming device places the picked selection at one of the positions with the same ranking as the picked selection's associated ranking. In another alternative embodiment, each selection is associated with a ranking and a selection group and the gaming device places the picked selection at the position which corresponds to the associated ranking and selection group of the picked selection. In different embodiments, the position of the picked selection is predetermined, randomly determined, determined based on a probability, determined based on the player's status (such as determined through a player tracking system), determined based on the player's wager, or determined based on any other suitable method.

Figure 5B:
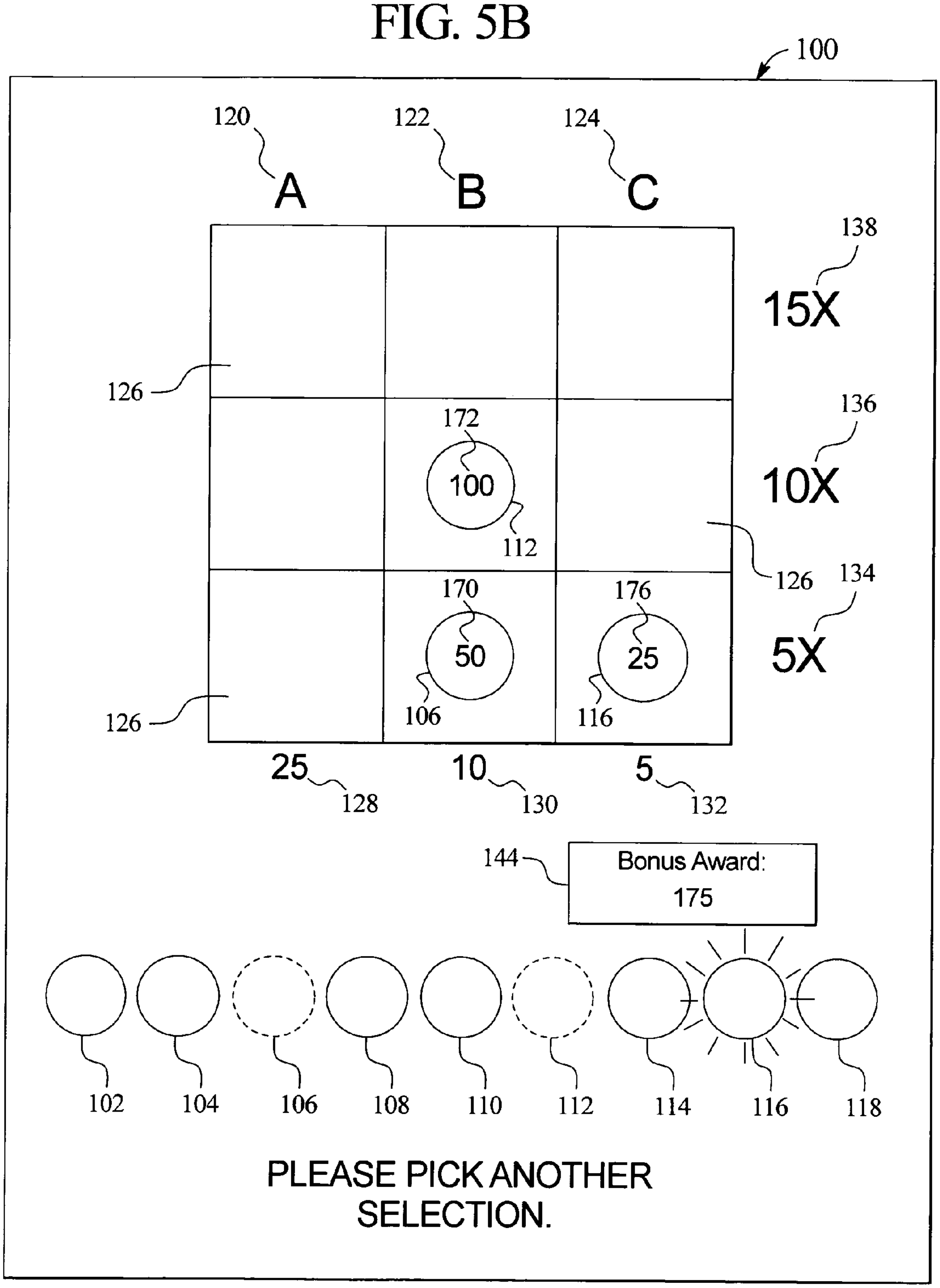

As illustrated in FIG. 5B, the player next picked highlighted selection 116. After determining that selection 116 was not associated with a terminator, the gaming device placed selection 116 in selection group C 124 (associated with a value of five) with a low ranking 134 (associated with a multiplier of five) to form an initial award of twenty-five 176. It should be appreciated that previously picked selections 106 and 112 are shown in phantom to indicate that they cannot be selected again by the player. In this embodiment, since none of the previously picked selections are associated with a terminator, the gaming device enables the player to pick another selection. Appropriate messages such as "PLEASE PICK ANOTHER SELECTION" may be provided to the player visually, or through suitable audio or audiovisual displays.

Figure 5C:
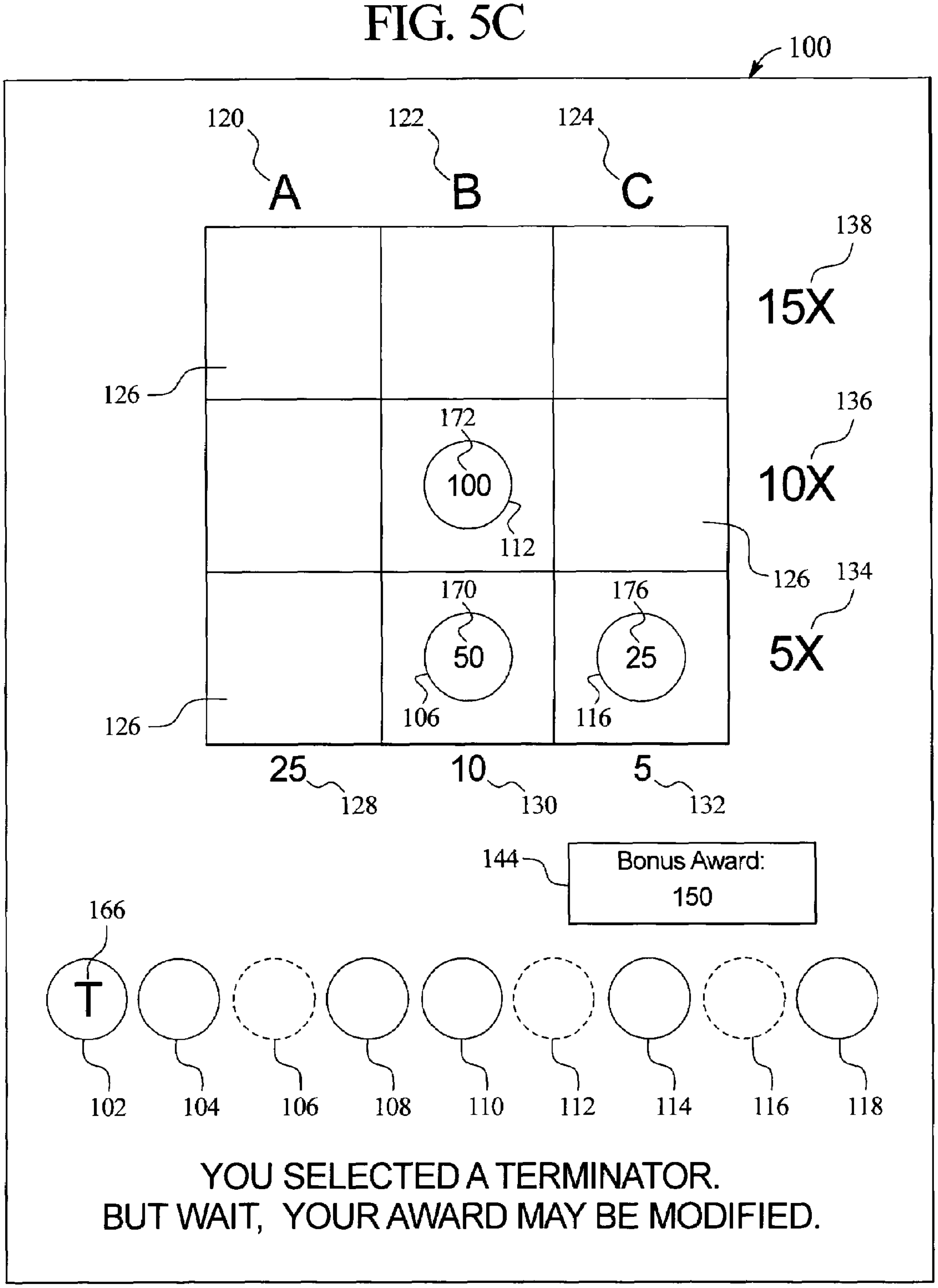

As seen in FIG. 5C, the player next picked highlighted selection 102 which is revealed to be associated with a terminator 166. Once a terminator is revealed, the player may no longer pick any selections and the gaming device modifies the positions of one or more of the picked selections. Appropriate messages such as "YOU SELECTED A TERMINATOR" and "BUT WAIT, YOUR AWARD MAY BE MODIFIED" may be provided to the player visually, or through suitable audio or audiovisual displays.

In one embodiment, one or more terminators are each associated with a value. In one embodiment, a plurality of the values associated with a plurality of the terminators are different. In another embodiment, each of the values associated with each of the terminators are different. In another embodiment, a plurality of the values associated with a plurality of the terminators are the same. In another embodiment, each of the values associated with each of the terminators are the same. In one embodiment, the award or value associated with the revealed terminator is determined by the gaming device positioning or placing the selection associated with the terminator to occupy one of the elements or positions of one of the groups or sets, wherein the award associated with the occupied element or position represents the award associated with the terminator. It should be appreciated that in this embodiment, when value or multiplier associated with one or more selection groups or one or more rankings is modified, In different embodiments, the values associated with each terminator are predetermined, randomly determined, determined based on a probability, determined based on the player's status (such as determined through a player tracking system), determined based on the player's wager, or determined based on any other suitable method.

Figure 5D:
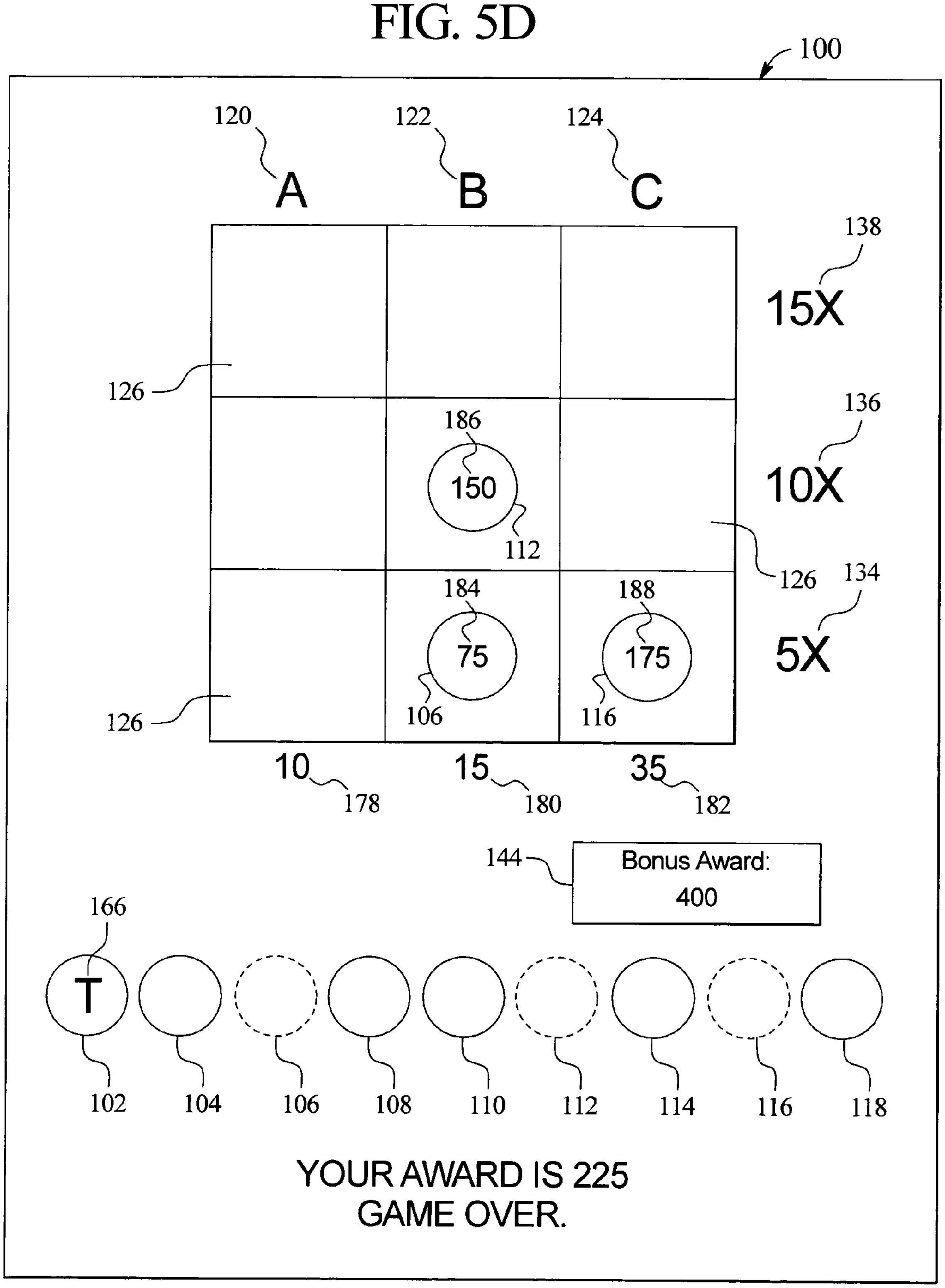

As seen in FIG. 5D, after a terminator is revealed, the gaming device provides the player any award or value associated with the revealed terminator. Additionally, the gaming device modifies the value associated with selection groups 128, 130 and 132. In this example, the gaming device modifies: (i) the value associated with selection group 128 to the modified value of ten 178; (ii) the value associated with selection group 130 to the modified value of fifteen 180; and (iii) the value associated with selection group 132 to the modified value of thirty-five 182. Accordingly, selection 106 is now associated with a modified value of seventy-five 184, selection 112 is now associated with a modified value of one-hundred-fifty 186, and selection 116 is now associated with a modified value of one-hundred-seventy-five 188. A bonus award of four-hundred is formed based on the modified values and any remaining unmodified values. The new award is provided to the player and the game ends. Appropriate messages such as "YOUR AWARD IS 400" and "GAME OVER" may be provided to the player visually, or through suitable audio or audiovisual displays. It should be appreciated that such modification may be accompanied by any suitable graphical representation.

In one embodiment, which value or multiplier is modified is based on which terminator is selected. For example, if one terminator is selected, the values or multipliers associated with one or more selection groups are modified, while if another terminator is selected, the values or multipliers associated with one or more rankings are modified. In this example, if another terminator is selected, the values or multipliers associated with one or more selection groups and the values or multipliers associated with one or more rankings are each modified, while if another terminator is selected, none of the values or multipliers associated with any selection groups or any rankings are modified. In different embodiments, which value(s) or multiplier(s) are modified is predetermined, randomly determined, determined based on a probability, determined based on the player's status (such as determined through a player tracking system), determined based on the player's wager, or determined based on any other suitable method.

In one embodiment, the modified values or multipliers are different than one or more of the unmodified values or multipliers. In another embodiment, the modified values or multipliers are the same as one or more of the unmodified values or multipliers. In another embodiment, the values or multipliers associated with the selection groups are shifted or jumbled such that one or more selection groups are each reassociated with a different value or multiplier. In another embodiment, the values or multipliers associated with the rankings are shifted or jumbled such that one or more rankings are each reassociated with a different value or multiplier. In different embodiments, the modified values or multipliers are predetermined, randomly determined, determined based on a probability, determined based on the player's status (such as determined through a player tracking system), determined based on the player's wager, or determined based on any other suitable method.

In another alternative embodiment (not shown), the gaming device provides the player a designated number of picks of the selections. In this embodiment, the player picks a selection for each pick and the gaming device places each pick on the grid as described above. After each of the picked selections are placed on the grid, the gaming device reveals if any of the picked selections are associated with a terminator. If none of the picked selections are associated with a terminator, the gaming device provides the player an award based on the currently occupied positions of each of the picked selections. If at least one of the picked selections is associated with a terminator, the gaming device removes each selection associated with a terminator and modifies the positions of the remaining picked selections to reflect the removal of one or more previously picked selections.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operable under control of a processor, said gaming device comprising:

a game controlled by the processor;

a plurality of different groups in the game, wherein each group includes at least one ranked position and a plurality of the groups each include a plurality of ranked positions;

a plurality of selections in the game, wherein each of a plurality of selections is initially associated with one of the groups;

a terminator in the game, wherein the terminator is associated with at least one of the selections;

a plurality of awards components in the game, each award component associated with one of the ranked positions; and a display device operable to display the game;

wherein the processor is operable with said display device to control a play of the game by:

(a) enabling a player to pick at least one of the selections;

(b) determining if the picked selection is associated with the terminator;

(c) if the picked selection is not associated with the terminator:

(i) revealing the group that the picked selection is initially associated with, (ii) positioning the picked selection at a lowest ranked unoccupied position of the group that the picked selection is initially associated with, and (iii) repeating (a) to (c) at least once; and (d) if the picked selection is associated with the terminator:

(i) modifying the occupied ranked position of at least one of the picked selections to a different one of the groups, wherein the picked selection is repositioned to the lowest ranked unoccupied position of the different group, (ii) determining an award based on the award components associated with the currently occupied position of each of the picked selections, and (iii) providing the determined award to the player.

2. The gaming device of claim 1, wherein each group includes a plurality of ranked positions.

3. The gaming device of claim 1, wherein the greater the rank of one of said positions, the greater the award component associated with said position.

4. The gaming device of claim 1, wherein said modification of the occupied ranked position of at least one of the picked selections includes removing at least one of the picked selections from the picked selection's currently occupied position and repositioning at least one of the remaining picked selections in the same group as the removed selection to the lowest ranked unoccupied position of said group.

5. The gaming device of claim 1, which includes modifying the occupied ranked position of a plurality of the picked selections.

6. The gaming device of claim 1, which includes modifying the occupied ranked position of each of the picked selections.

7. The gaming device of claim 1, wherein the award component associated with each position is based on a value associated with the group of the position and a modifier associated with the rank of the position.

8. A gaming device operable under control of a processor, said gaming device comprising:

a display device;

an input device; and said processor configured to operate with the display device and the input device to provide:

a plurality of selections, wherein a plurality of the selections are each initially associated with one of a plurality of groups and at least one of the selections is associated with a terminator;

a plurality of ranked positions, each ranked position included in one of said groups and each ranked position associated with an award component;

a selection picking sequence, said selection picking sequence includes enabling a player to pick the selections until the player picks one of the selections associated with the terminator, wherein each picked selection is positioned at a lowest ranked unoccupied position of the group that the picked selection is initially associated with; and a picked selection modification sequence occurring when the player picks one of the selections associated with the terminator, said picked selection modification sequence including modifying the occupied ranked position of at least one of the picked selections to a different one of the groups, wherein the picked selection is repositioned to the lowest ranked unoccupied position of the different group, determining an award based on the award components associated with the currently occupied position of each of the picked selections, and providing the determined award to the player.

9. A gaming device operable under control of a processor, said gaming device comprising:

a game controlled by the processor;

a plurality of ranked positions in the game;

a plurality of selections in the game;

a terminator in the game, wherein the terminator is associated with at least one of the selections;

a plurality of awards components in the game, each award component associated with one of the positions; and a display device operable to display the game;

wherein the processor is operable with the display device to control a play of the game by:

(a) enabling a player to pick at least one of the selections;

(b) determining if the picked selection is associated with the terminator;

(c) if the picked selection is not associated with the terminator:

(i) positioning the picked selection at one of the unoccupied ranked positions, and (ii) repeating (a) to (c) at least once; and (d) if the picked selection is associated with the terminator:

(i) modifying the occupied ranked position of at least one of the picked selections to a different one of the unoccupied ranked positions, (ii) determining an award based on the award components associated with the current occupied position of each of the picked selections, and (iii) providing the determined award to the player.

10. The gaming device of claim 9, wherein the greater the rank of one of the positions, the greater the award component associated with the position.

11. The gaming device of claim 9, wherein said modification of the occupied ranked position of at least one of the picked selections includes removing at least one of the picked selections from the picked selection's currently occupied position and repositioning at least one of the remaining picked selections based on the removal of said picked selection.

12. The gaming device of claim 9, which includes modifying the occupied ranked position of a plurality of the picked selections.

13. The gaming device of claim 9, which includes modifying the occupied ranked position of each of the picked selections.

14. The gaming device of claim 9, wherein the award component associated with each position is based on a value associated with the selection group of the position and a modifier associated with the rank of the position.

15. The gaming device of claim 9, wherein said modification of the occupied ranked position of at least one of the picked selections includes repositioning at least one of the picked selections to a predetermined ranked position.

16. A gaming device operable under control of a processor, said gaming device comprising:

a display device;

an input device; and said processor configured to operate with the display device and the input device to provide:

a plurality of ranked positions;

a plurality of selections;

a terminator associated with at least one of the selections;

a plurality of awards components, each award component associated with one of the positions;

a selection picking sequence, said selection picking sequence includes enabling a player to pick the selections until the player picks one of the selections associated with the terminator, wherein each picked selection is positioned at one of the unoccupied ranked positions; and a picked selection modification sequence occurring when the player picks one of the selections associated with the terminator, said picked selection modification sequence including modifying the occupied ranked position of at least one of the picked selections to a different one of the unoccupied ranked positions, determining an award based on the award components associated with the current occupied position of each of the picked selections, and providing the determined award to the player.

17. The gaming device of claim 16, wherein the picked selection modification sequence includes modifying the occupied ranked position of a plurality of the picked selections.

18. The gaming device of claim 16, wherein the picked selection modification sequence includes modifying the occupied ranked position of each of the picked selections.

* * * * *

UNITED STATES PATENT AND TRADEMARK OFFICE

CERTIFICATE OF CORRECTION

PATENT NO. : 7,507,155 B2
APPLICATION NO. : 11/219994
DATED : March 24, 2009
INVENTOR(S) : Randall D. Mead et al.

It is certified that error appears in the above-identified patent and that said Letters Patent is hereby corrected as shown below:

Title Page; item (75);

Under the listed Inventors, change “Eric S. Nelson” to --Eric S. Boese--.

Signed and Sealed this

Second Day of June, 2009

JOHN DOLL
*Acting Director of the United States Patent and Trademark Office*

UNITED STATES PATENT AND TRADEMARK OFFICE

CERTIFICATE OF CORRECTION

PATENT NO. : 7,507,155 B2
APPLICATION NO. : 11/219994
DATED : March 24, 2009
INVENTOR(S) : Mead et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 583 days.

Delete the phrase "by 583 days" and insert -- by 603 days --

Signed and Sealed this

Twenty-fourth Day of November, 2009

David J. Kappos

*Director of the United States Patent and Trademark Office*